(12) United States Patent
Zhou et al.

(10) Patent No.: US 12,212,994 B2
(45) Date of Patent: Jan. 28, 2025

(54) BEAM FAILURE REASON DETERMINING AND REPORTING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 676 days.

(21) Appl. No.: 17/463,495

(22) Filed: Aug. 31, 2021

(65) Prior Publication Data

US 2023/0063014 A1    Mar. 2, 2023

(51) Int. Cl.
    *H04W 24/10*    (2009.01)
(52) U.S. Cl.
    CPC .................................. *H04W 24/10* (2013.01)

(58) Field of Classification Search
    CPC .. H04W 24/10; H04B 7/06964; H04L 5/0023; H04L 5/005
    See application file for complete search history.

(56) References Cited

U.S. PATENT DOCUMENTS

| | | | |
|---|---|---|---|
| 2019/0253986 A1* | 8/2019 | Jeon | H04L 5/0048 |
| 2024/0056160 A1* | 2/2024 | Zhang | H04B 7/06964 |

\* cited by examiner

*Primary Examiner* — Chuong A Ngo
(74) *Attorney, Agent, or Firm* — Holland & Hart LLP

(57) ABSTRACT

Methods, systems, and devices for wireless communication are described. A user equipment or a base station may use the techniques described herein to report one or more beam failures and subsequently determine the reason the beam failures have occurred (e.g., interference or noise). For example, the UE may transmit information to the base station that is related to the beam failure in addition to a beam failure indication. In some cases, the UE may indicate the reason the beam failure occurred. Because the base station may factor in the reason when selecting and indicating new beams for communicating with the UE, the likelihood that beam failure will occur again may decrease.

30 Claims, 20 Drawing Sheets

BEAM FAILURE REASON DETERMINING AND REPORTING

FIELD OF TECHNOLOGY

The following relates to wireless communication, including beam failure reason determining and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may support beamformed communications using one or more beams (e.g., a directional beam). In some cases, one or more of the beams may fail resulting in communication failures between the UE and the base station. In response to the failure, the UE and the base station may perform a beam failure recovery procedure to re-establish a connection. Improved techniques related to beam failure recovery may be desired.

SUMMARY

The described techniques relate to improved methods, systems, devices, and apparatuses that support beam failure reason determining and reporting. Generally, the described techniques provide for improving beam failure reporting and recovery techniques by supporting the communication of information indicative of one or more factors that contribute to causing beam failure. For example, a base station may transmit a set of reference signals to a user equipment (UE) over a set of beam measurement opportunities, where a beam measurement opportunity corresponds to a periodic time period during which a reference signal associated with beam failure detection may be transmitted (e.g., beam failure detection-reference signals (BFD-RSs), periodic channel state information (CSI) reference signal (CSI-RSs), synchronization signal blocks (SSBs)). The UE may receive the set of reference signals using a beam and may generate a set of beam failure indicators (BFIs) based on the reference signals (e.g., a BFI for each reference signal that is associated with a block error rate (BLER) that satisfies a threshold BLER). If a quantity of the generated BFIs satisfies a threshold quantity (e.g., within a duration, before a timer associated with beam failure detection expires), the UE may transmit first information to the base station indicating that beam failure has occurred.

In addition to transmitting the first information, the UE may transmit second information to the base station that is indicative of one or more contributing factors to the beam failure (e.g., interference experienced at the UE, noise experienced at the UE, or a combination thereof). In some examples, the UE may determine the one or more contributing factors (e.g., based on a quantity of consecutive BFIs generated by the UE, based on one or channel measurements performed on the set of reference signals) and may include an indication of the one or more contributing factors in the second information. In some other examples, the second information may include information that enables the base station to determine the one or more contributing factors.

The UE and the base station may perform a beam failure recovery procedure in response to the first information. For example, the UE may initiate a random access channel (RACH) procedure by transmitting the first information. Alternatively, the first information may be a beam failure recovery request (BFRQ) that initiates the beam failure recovery procedure. The base station may indicate a new beam for communicating with the UE based on the second information (e.g., transmitted after the RACH procedure, included in the BFRQ). For example, the base station may indicate the new beam that is selected to reduce or mitigate the one or more contributing factors, thereby decreasing the likelihood that the one or more contributing factors will cause subsequent beam failures.

A method for wireless communication at a UE is described. The method may include receiving, from a base station, a set of multiple reference signals over a set of multiple beam measurement opportunities, generating a set of BFIs based on the set of multiple reference signals, each BFI of the set of BFIs corresponding to a beam measurement opportunity of the set of multiple beam measurement opportunities, and transmitting, to the base station, first information that is indicative of beam failure occurring based on the set of BFIs satisfying a first threshold and second information that is indicative of one or more contributing factors to the beam failure.

An apparatus for wireless communication at a UE is described. The apparatus may include a processor, memory coupled with the processor, and instructions stored in the memory. The instructions may be executable by the processor to cause the apparatus to receive, from a base station, a set of multiple reference signals over a set of multiple beam measurement opportunities, generate a set of BFIs based on the set of multiple reference signals, each BFI of the set of BFIs corresponding to a beam measurement opportunity of the set of multiple beam measurement opportunities, and transmit, to the base station, first information that is indicative of beam failure occurring based on the set of BFIs satisfying a first threshold and second information that is indicative of one or more contributing factors to the beam failure.

Another apparatus for wireless communication at a UE is described. The apparatus may include means for receiving, from a base station, a set of multiple reference signals over a set of multiple beam measurement opportunities, means for generating a set of BFIs based on the set of multiple reference signals, each BFI of the set of BFIs corresponding to a beam measurement opportunity of the set of multiple beam measurement opportunities, and means for transmitting, to the base station, first information that is indicative of beam failure occurring based on the set of BFIs satisfying a first threshold and second information that is indicative of one or more contributing factors to the beam failure.

A non-transitory computer-readable medium storing code for wireless communication at a UE is described. The code may include instructions executable by a processor to receive, from a base station, a set of multiple reference signals over a set of multiple beam measurement opportunities, generate a set of BFIs based on the set of multiple reference signals, each BFI of the set of BFIs corresponding to a beam measurement opportunity of the set of multiple beam measurement opportunities, and transmit, to the base station, first information that is indicative of beam failure occurring based on the set of BFIs satisfying a first threshold and second information that is indicative of one or more contributing factors to the beam failure.

In some examples of the method, apparatuses, and non-transitory computer-readable medium described herein, transmitting the second information may include operations, features, means, or instructions for transmitting an indication of a value of a consecutive BFI counter, where the indication of the value of the consecutive BFI counter indicates the one or more contributing factors to the beam failure.

In some examples of the method, apparatuses, and non-transitory computer-readable medium described herein, the second information indicates that the one or more contributing factors include interference experienced at the UE based on a greatest value of the consecutive BFI counter satisfying a second threshold.

In some examples of the method, apparatuses, and non-transitory computer-readable medium described herein, the second information indicates that the one or more contributing factors include noise experienced at the UE based on a greatest value of the consecutive BFI counter failing to satisfy a second threshold.

In some examples of the method, apparatuses, and non-transitory computer-readable medium described herein, the second information includes a first indication of whether a greatest value of the consecutive BFI counter satisfies a second threshold or a second indication of the greatest value of the consecutive BFI counter.

In some examples of the method, apparatuses, and non-transitory computer-readable medium described herein, the second information indicates a total quantity of BFIs of the set of BFIs that correspond to consecutive reference signals of the set of multiple reference signals in a time domain.

Some examples of the method, apparatuses, and non-transitory computer-readable medium described herein may further include operations, features, means, or instructions for performing one or more channel measurements on the set of multiple reference signals, where the second information may be based on the one or more channel measurements.

Some examples of the method, apparatuses, and non-transitory computer-readable medium described herein may further include operations, features, means, or instructions for mapping the one or more channel measurements to the one or more contributing factors, where the second information includes an indication of the one or more contributing factors based on the mapping.

In some examples of the method, apparatuses, and non-transitory computer-readable medium described herein, the second information indicates that the one or more contributing factors include interference experienced at the UE based on a quantity of measurement occasions satisfying a threshold quantity, a measurement occasion of the quantity of measurement occasions corresponding to a signal-to-interference-plus-noise ratio (SINR) for a reference signal of the set of multiple reference signals being less than an SINR threshold and a signal-to-noise ratio (SNR) for the reference signal exceeding an SNR threshold based on the one or more channel measurements.

In some examples of the method, apparatuses, and non-transitory computer-readable medium described herein, the second information indicates that the one or more contributing factors include noise experienced at the UE based on a quantity of measurement occasions failing to satisfy a threshold quantity, a measurement occasion of the quantity of measurement occasions corresponding to an SINR for a reference signal of the set of multiple reference signals being less than an SINR threshold and an SNR for the reference signal exceeding an SNR threshold based on the one or more channel measurements.

In some examples of the method, apparatuses, and non-transitory computer-readable medium described herein, the second information indicates that the one or more contributing factors include interference experienced at the UE based on a quantity of measurement occasions satisfying a threshold quantity, a measurement occasion of the quantity of measurement occasions corresponding to an SINR for a reference signal of the set of multiple reference signals being less than an SINR threshold and a reference signal received power (RSRP) for the reference signal exceeding an RSRP threshold based on the one or more channel measurements.

In some examples of the method, apparatuses, and non-transitory computer-readable medium described herein, the second information indicates that the one or more contributing factors include noise experienced at the UE based on a quantity of measurement occasions failing to satisfy a threshold quantity, a measurement occasion of the quantity of measurement occasions corresponding to an SINR for a reference signal of the set of multiple reference signals being less than an SINR threshold and an RSRP for the reference signal exceeding an RSRP threshold based on the one or more channel measurements.

In some examples of the method, apparatuses, and non-transitory computer-readable medium described herein, the second information includes the one or more channel measurements.

In some examples of the method, apparatuses, and non-transitory computer-readable medium described herein, the one or more channel measurements include an SINR for each of the set of multiple reference signals, an SNR for each of the set of multiple reference signals, an RSRP for each of the set of multiple reference signals, or a combination thereof.

Some examples of the method, apparatuses, and non-transitory computer-readable medium described herein may further include operations, features, means, or instructions for receiving, from the base station, a configuration message including a set of parameters associated with the second information.

In some examples of the method, apparatuses, and non-transitory computer-readable medium described herein, the set of parameters includes a set of contributing factors capable of causing the beam failure that includes the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

Some examples of the method, apparatuses, and non-transitory computer-readable medium described herein may further include operations, features, means, or instructions for transmitting, to the base station, a request to change one or more parameters of the set of parameters and receiving, from the base station, a second configuration message including a second set of parameters associated with the second information, the second set of parameters corresponding to an updated set of parameters based on the request.

Some examples of the method, apparatuses, and non-transitory computer-readable medium described herein may further include operations, features, means, or instructions for initiating a RACH procedure associated with beam failure recovery based on the set of BFIs satisfying the first threshold, where the second information may be transmitted after a completion of the RACH procedure.

In some examples of the method, apparatuses, and non-transitory computer-readable medium described herein, the second information may be transmitted via a medium access control-control element (MAC-CE), uplink control information (UCI) signaling, or a combination thereof.

In some examples of the method, apparatuses, and non-transitory computer-readable medium described herein, the second information may be transmitted via a BFRQ on a primary cell based on the beam failure being associated with communications between the UE and the base station on a secondary cell.

In some examples of the method, apparatuses, and non-transitory computer-readable medium described herein, the one or more contributing factors include interference experienced at the UE or noise experienced at the UE.

Some examples of the method, apparatuses, and non-transitory computer-readable medium described herein may further include operations, features, means, or instructions for performing a beam failure recovery procedure with the base station based on the first information and the second information.

A method for wireless communication at a base station is described. The method may include transmitting, to a UE, a set of multiple reference signals over a set of multiple beam measurement opportunities and receiving, from the UE, first information that is indicative of beam failure occurring and second information that is indicative of one or more contributing factors to the beam failure.

An apparatus for wireless communication at a base station is described. The apparatus may include a processor, memory coupled with the processor, and instructions stored in the memory. The instructions may be executable by the processor to cause the apparatus to transmit, to a UE, a set of multiple reference signals over a set of multiple beam measurement opportunities and receive, from the UE, first information that is indicative of beam failure occurring and second information that is indicative of one or more contributing factors to the beam failure.

Another apparatus for wireless communication at a base station is described. The apparatus may include means for transmitting, to a UE, a set of multiple reference signals over a set of multiple beam measurement opportunities and means for receiving, from the UE, first information that is indicative of beam failure occurring and second information that is indicative of one or more contributing factors to the beam failure.

A non-transitory computer-readable medium storing code for wireless communication at a base station is described. The code may include instructions executable by a processor to transmit, to a UE, a set of multiple reference signals over a set of multiple beam measurement opportunities and receive, from the UE, first information that is indicative of beam failure occurring and second information that is indicative of one or more contributing factors to the beam failure.

Some examples of the method, apparatuses, and non-transitory computer-readable medium described herein may further include operations, features, means, or instructions for performing a beam failure recovery procedure with the UE based on the first information and the second information.

In some examples of the method, apparatuses, and non-transitory computer-readable medium described herein, the second information indicates the one or more contributing factors to the beam failure.

Some examples of the method, apparatuses, and non-transitory computer-readable medium described herein may further include operations, features, means, or instructions for transmitting, to the UE, a configuration message including a set of parameters associated with the second information.

In some examples of the method, apparatuses, and non-transitory computer-readable medium described herein, the set of parameters includes a set of contributing factors capable of causing the beam failure that includes the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

Some examples of the method, apparatuses, and non-transitory computer-readable medium described herein may further include operations, features, means, or instructions for receiving, from the UE, a request to change one or more parameters of the set of parameters and transmitting, to the UE, a second configuration message including a second set of parameters associated with the second information, the second set of parameters corresponding to an updated set of parameters based on the request.

Some examples of the method, apparatuses, and non-transitory computer-readable medium described herein may further include operations, features, means, or instructions for performing a RACH procedure associated with beam failure recovery based on the first information, where the second information may be received after a completion of the RACH procedure.

In some examples of the method, apparatuses, and non-transitory computer-readable medium described herein, the one or more contributing factors include interference experienced at the UE or noise experienced at the UE.

DETAILED DESCRIPTION

Figure 1:
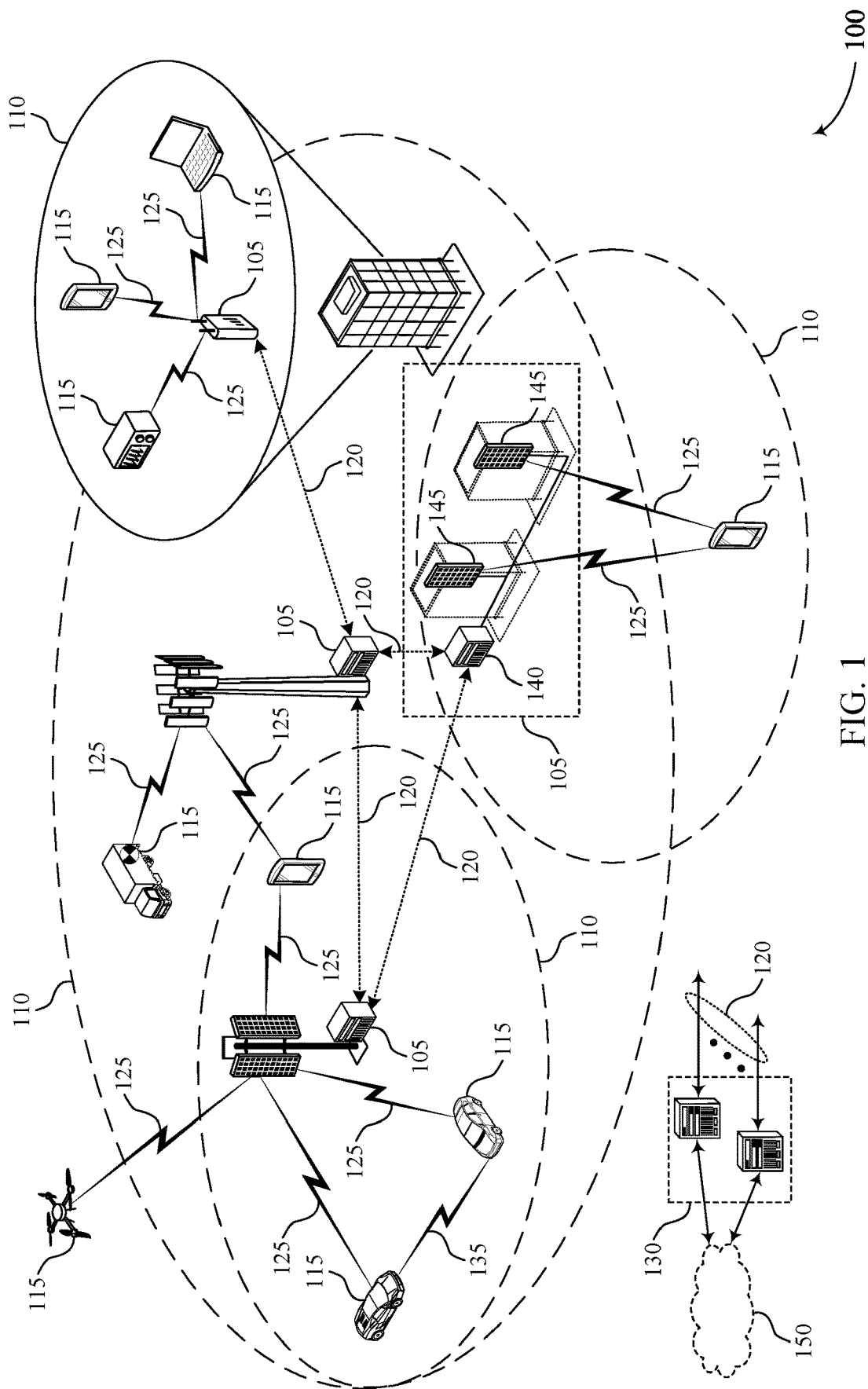
FIGS. 1 and 2 illustrate examples of wireless communications systems that support beam failure reason determining and reporting in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth generation (5G) systems, which may be referred to as New Radio (NR) systems. In some examples, a wireless communications system may support beamformed communications between a UE and a base station using one or more beams. In some cases, one or more of the beams may fail, and the UE may transmit an indication to the base station that beam failure has occurred. In response to the indication that beam failure has occurred, the UE and the base station may perform a beam failure recovery procedure to re-establish a connection and may select one or more new beams over which to communicate (e.g., as part of the beam failure recovery procedure). However, a reason that the beam failure occurred may be unknown and thus uncommunicated. Accordingly, the one or more new beams selected during the beam failure recovery procedure may be vulnerable to a same cause of the initial beam failure, thus, in some cases, increasing a likelihood that beam failure will occur again and reducing a reliability of subsequent communications.

Techniques, systems, and devices are described herein for enhanced beam failure reporting and recovery procedures. For example, a base station may transmit a set of reference signals to a UE over a set of beam measurement opportunities, where a beam measurement opportunity corresponds to a periodic time period during which a reference signal associated with beam failure detection may be transmitted (e.g., beam failure detection-reference signals (BFD-RSs), periodic channel state information (CSI) reference signal (CSI-RSs), synchronization signal blocks (SSBs)). The set of reference signals may enable the UE to determine whether beam failure has occurred. For instance, the UE may receive the set of reference signals using a beam and may generate, for each reference signal, a beam failure indicator (BFI) corresponding to the reference signal if an estimated block error rate (BLER) of the reference signal satisfies (e.g., meets or exceeds) a threshold BLER. Otherwise, the UE may refrain from generating a BFI for the reference signal. Based on the generated BFIs, the UE may determine whether the beam has failed (e.g., whether a quantity of the generated BFIs satisfies a threshold quantity within a duration) and, if the beam has failed (e.g., the quantity of generated BFIs meets or exceed the threshold quantity), may transmit first information to the base station indicating that beam failure has occurred.

In addition to transmitting the first information, the UE may transmit (e.g., in a same or different message that carries the first information) second information to the base station that is indicative of one or more contributing factors to the beam failure (e.g., the reason that beam failure occurred). For example, the one or more contributing factors to the beam failure may include at least interference experienced at the UE, noise experienced at the UE, or a combination thereof. In some examples, the UE may determine the one or more contributing factors (e.g., based on a quantity of consecutive BFIs generated by the UE, based on one or more channel measurements performed on the set of reference signals) and may include an indication of the one or more contributing factors in the second information. In some other examples, the second information may include information that enables the base station to determine the one or more contributing factors.

The UE and the base station may perform a beam failure recovery procedure in response to the first information. For example, the UE may initiate a random access channel (RACH) procedure by transmitting the first information. Alternatively, the first information may be a beam failure recovery request (BFRQ) that initiates the beam failure recovery procedure. The base station may indicate a new beam for communicating with the UE based on the second information (e.g., transmitted after the RACH procedure, included in the BFRQ). For example, the base station may indicate the new beam that is selected to reduce or mitigate the one or more contributing factors, thereby decreasing the likelihood that the one or more contributing factors will cause subsequent beam failures. For instance, if the one or more contributing factors include noise experienced at the UE, the base station may select a new beam that is associated with a higher signal strength than the failed beam (e.g., a beam associated with a strongest signal strength of a set of candidate beams) in order to reduce the effects of noise, among other associated parameters that may reduce adverse noise effects. Additionally, or alternatively, if the one or more contributing factors include interference experienced at the UE, the base station may select a new beam that is associated with a relatively low interference level between the UE and the base station.

Aspects of the subject matter described in this disclosure may be implemented to realize one or more of the following potential improvements, among others. The techniques employed by the UE and the base station may provide benefits and enhancements to the operation of the UE and the base station. For example, operations performed by the UE and the base station may enable enhanced beam failure reporting and recovery techniques that reduce a likelihood of subsequent beam failures. In some examples, communicating information that is indicative of one or more contributing factors to beam failure may reduce a frequency of performing beam failure recovery procedures, increase reliability, reduce latency, increase data rates, and increase spectral efficiency. In some other examples, communicating information that is indicative of one or more contributing factors to beam failure may provide improvements to resource utilization, coordination between devices, and processing capability, among other benefits.

Aspects of the disclosure are initially described in the context of wireless communications systems. Aspects of the disclosure are additionally described in the context of determination procedures. Aspects of the disclosure are further illustrated by and described with reference to apparatus diagrams, system diagrams, and flowcharts that relate to beam failure reason determining and reporting.

FIG. 1 illustrates an example of a wireless communications system 100 that supports beam failure reason determining and reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

To support beamformed communications, a UE 115 and a base station 105 may perform beam failure detection procedures and beam failure recovery procedures. For example, various factors, such as interference or noise, may cause a beam used by the UE 115 or the base station 105 to fail such that signals communicated using the beam may suffer reduced quality and, in some cases, may not be properly decoded. Accordingly, the UE 115 and the base station 105 may discontinue communicating using the beam and may perform a beam failure recovery procedure during which one or more new beams may be selected (e.g., and indicated) for communicating.

In order to detect a failure of a beam, a UE 115 may perform a beam failure detection procedure. For example, a base station 105 may transmit reference signals that may enable the UE 115 to determine whether beam failure has occurred, which may be referred to as BFD-RSs. In some examples, BFD-RSs may be periodic reference signals (e.g., periodic CSI-RSs, SSBs) transmitted during beam measurement opportunities, where a beam measurement opportunity corresponds to a periodic (e.g., and configured) time period during which the base station 105 may transmit a BFD-RS. To determine whether beam failure has occurred, the UE 115 may perform one or more channel measurements on the BFD-RSs and may determine, at a physical layer at the UE 115, whether the one or more channel measurements satisfy a measurement threshold. If the one or more channel measurements satisfy the measurement threshold, the physical layer at the UE 115 may report a BFI to a MAC layer at the UE 115. In some examples, the measurement threshold may be a threshold BLER (e.g., a 10% BLER), and a trigger condition for reporting the BFI may be an estimated BLER of a BFD-RS satisfying the threshold BLER (e.g., having an estimated BLER greater than the threshold BLER). The MAC layer may track a count of the BFIs received from the physical layer, and, if the quantity of BFIs received from the physical layer satisfies (e.g., meets or exceeds) a threshold quantity (e.g., before an expiration of a beam failure detection timer), the MAC layer may trigger the UE 115 to transmit a beam failure report to the base station 105 (e.g., an indication that beam failure has occurred). In response to the beam failure report, the UE 115 and the base station 105 may perform a beam failure recovery procedure to re-establish communications between the UE 115 and the base station 105.

Various aspects of the described techniques support improved beam failure reporting and recovery techniques by supporting the communication of information indicative of one or more factors that contribute to causing beam failure. For example, a base station 105 may transmit a set of BFD-RSs over a set of beam measurement opportunities to a UE 115. The UE 115 may receive the set of BFD-RSs and may generate BFIs (e.g., and report the BFIs to a MAC layer at the UE 115) based on the BFD-RSs. If the UE 115 determines that beam failure has occurred based on the generated BFIs, the UE 115 may transmit information that is indicative of one or more contributing factors to the beam failure in addition to a beam failure report. For example, the UE 115 may transmit information that is indicative of whether interference or noise was a primary cause of the beam failure. Accordingly, during a beam failure recovery procedure performed in response to the beam failure report, the base station 105 and/or the UE 115 may select a new beam to mitigate or reduce the effects of the one or more contributing factors, thereby increasing a reliability of subsequent communications on the new beam.

Figure 2:
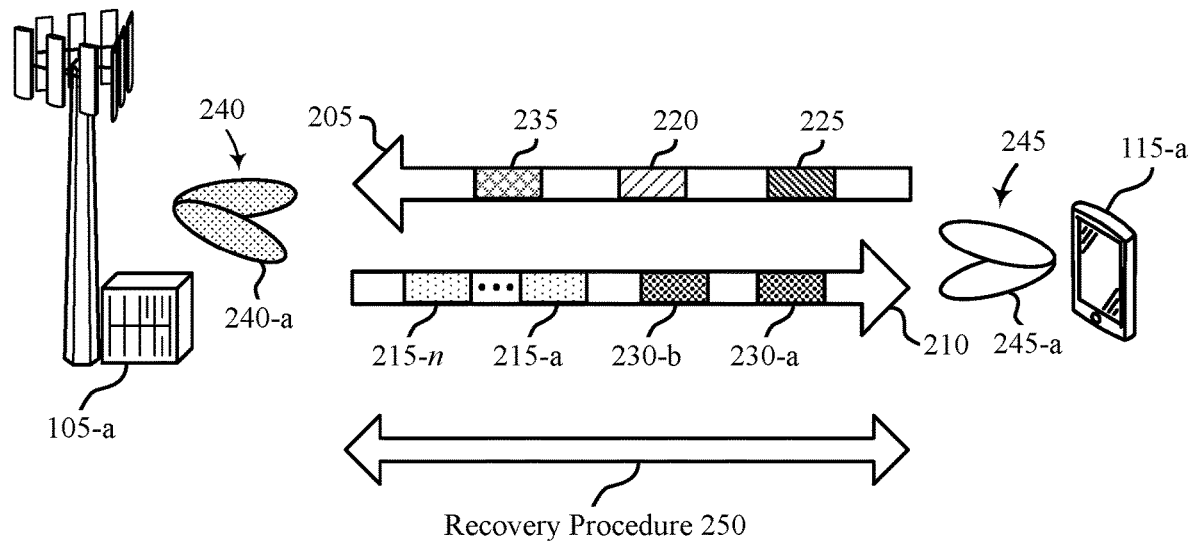
Figure 2:
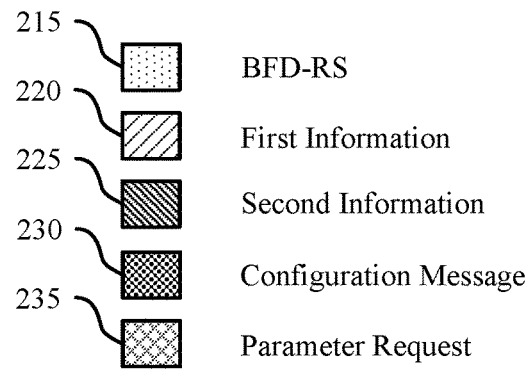

FIG. 2 illustrates an example of a wireless communications system 200 that supports beam failure reason determining and reporting in accordance with aspects of the present disclosure. The wireless communications system 200 may implement aspects of the wireless communications system 100 or may be implemented by aspects of the wireless communications system 100. For example, the wireless communications system 200 may include a base station 105-a and a UE 115-a which may be examples of the corresponding devices described with reference to FIG. 1. In some aspects, the wireless communications system 200 may support multiple RATs including 4G systems and 5G systems which may be referred to as NR systems. The wireless communications system 200 may support the determination and reporting of a beam failure reason (e.g., or information indicative of a beam failure reason) to reduce the occurrence of beam failure and support improved reliability, latency, data rates, resource utilization, spectral efficiency, coordination between devices, and processing capability, among other benefits.

The wireless communications system 200 may support communications between the UE 115-a and the base station 105-a. For example, the UE 115-a may transmit uplink messages to the base station 105-a over a communication link 205 (e.g., which may be an example of a communication link 125 described with reference to FIG. 1) and may receive downlink messages on a communication link 210 (which may be an example of a communication link 125). The wireless communications system 200 may additionally support beamformed communications between the base station 105-a and the UE 115-a. For example, the base station 105-a may transmit and receive messages using one or more of a set of base station beams 240, and the UE 115-a may transmit and receive messages using one or more of a set of UE beams 245.

The UE 115-a and the base station 105-a may support detecting a failure of a beam (e.g., a base station beam 240, a UE beam 245). For example, the base station 105-a may communicate messages with the UE 115-a using a base station beam 240-a and the UE 115-a may communicate messages with the base station 105-a using a UE beam 245-a that corresponds to the base station beam 240-a (e.g., which may constitute a beam pair). In order to enable failure detection of a beam of the beam pair, the base station 105-a may periodically transmit BFD-RSs 215 to the UE 115-a using the base station beam 240-a over periodic beam measurement opportunities. For example, the base station 105-a may transmit a BFD-RS 215-a through a BFD-RS 215-n to the UE 115-a over corresponding beam measurement opportunities (e.g., using the base station beam 240-a), and the UE 115-a may receive the BFD-RS 215-a through the BFD-RS 215-n using the UE beam 245-a.

The UE 115-a may generate a set of BFIs based on the received BFD-RSs 215 to determine whether beam failure has occurred. For example, for each BFD-RS 215 received from the base station 105-a, the UE 115-a may determine whether to generate a BFI (e.g., at a physical layer at the UE 115-a). For instance, the UE 115-a may estimate a BLER for each BFD-RS 215 and may report a BFI to a MAC layer at the UE 115-a for each BLER that satisfies (e.g., meets or exceeds) a threshold BLER. If a quantity of reported BFIs satisfies a threshold quantity of reported BFIs (e.g., within a duration), the UE 115-a may determine that beam failure has occurred (e.g., that communications using the beam pair are no longer viable). Accordingly, the UE 115-a may generate and transmit first information 220 to the base station 105-a that is indicative of the beam failure. For example, the first information 220 may be a beam failure report that indicates the beam failure to the base station 105-a.

The UE 115-a and the base station 105-a may additionally support determining a reason (e.g., a cause) of a beam failure. For example, the UE 115-a or the base station 105-a may determine the reason of the beam failure based on a quantity of consecutive BFIs included in the generated and reported BFIs, where consecutive BFIs corresponds to BFIs generated for consecutive BFD-RSs 215 in the time domain. For instance, if the quantity of consecutive BFIs satisfies (e.g., meets or exceeds) a threshold quantity of consecutive BFIs, the UE 115-a or the base station 105-a may determine that a primary contributing factor to the beam failure is interference experienced at the UE 115-a. Alternatively, if the quantity of consecutive BFIs fails to satisfy (e.g., is less than, is less than or equal to) the threshold quantity of consecutive BFIs, the UE 115-a or the base station 105-a may determine that the primary contributing factor to the beam failure is noise experienced at the UE 115-a. Additional details related to determining the reason of the beam failure based on the quantity of consecutive BFIs are described with reference to FIG. 3 below.

In some examples, the UE 115-a or the base station 105-a may determine the reason of the beam failure based on one or more channel measurements performed on the BFD-RSs 215. For example, the UE 115-a may measure a signal-to-interference-plus-noise ratio (SINR), an SNR, a reference signal received power (RSRP), or a combination thereof, for each BFD-RS 215. Based on the one or more channel measurements (e.g., the SINR measurements, the SNR measurements, the RSRP measurements, or a combination thereof) the UE 115-a or the base station 105-a may determine whether the primary contributing factor to the beam failure is interference experienced at the UE 115-a or noise experienced at the UE 115-a. Additional details related to determining the reason of the beam failure based on the one or more channel measurements performed on the BFD-RSs 215 are described with reference to FIGS. 4A and 4B below.

The UE 115-a may transmit second information 225 to the base station 105-a that is indicative of the reason of the beam failure. In some examples, the UE 115-a may transmit the first information 220 and the second information 225 in a same message. In some other examples, the UE 115-a may transmit the first information 220 and the second information 225 in different messages. The second information 225 may include an indication of one or more contributing factors to the beam failure. For instance, the second information 225 may include a first indication of the primary (e.g., main) contributing factor to the beam failure (e.g., interference experienced at the UE 115-a, noise experienced at the UE 115-a). In some cases, the second information 225 may include a second indication of a secondary (e.g., lesser) contributing factor to the beam failure (e.g., noise experienced at the UE 115-a, interference experienced at the UE 115-a). Accordingly, the base station 105-a may determine the reason of the beam failure based on the indication of the one or more contributing factors included in the second information 225.

Alternatively, the second information 225 may include information that enables the base station 105-a to determine the reason of the beam failure (e.g., the one or more contributing factors). In some examples, the second information 225 may include a greatest value of a consecutive BFI counter that tracks a quantity of consecutive BFIs included in the generated and reported BFIs (e.g., a greatest quantity of consecutive BFIs). Here, the base station 105-a may determine whether the greatest value satisfies (e.g., meets or exceeds) a threshold value to determine whether the primary contributing factor to the beam failure is interference experienced at the UE 115-a or noise experienced at the UE 115-a. In some examples, the second information 225 may include an indication of whether the greatest value satisfies the threshold value and the base station 105-a may determine the primary contributing factor based on the indication. In some cases, the second information 225 may indicate a total quantity of consecutive BFIs included in the generated and reported BFIs, and the base station 105-a may determine the primary contributing factor based on whether the total quantity of consecutive BFIs satisfies (e.g., meets or exceeds) a threshold total quantity. For example, if the total quantity of consecutive BFIs satisfies the threshold total quantity, the base station 105-a may determine that the primary contributing factor is interference experienced at the UE 115-a. Alternatively, if the total quantity of consecutive BFIs fails to satisfy (e.g., is less than, is less than or equal to) the threshold total quantity, the base station 105-a may determine that the primary contributing factor is noise experienced at the UE 115-a. In some examples, the second information 225 may include the one or more channel measurements performed on the BFD-RSs 215, and the base station 105-a may determine the reason of the beam failure based on the one or more channel measurements.

Based on the first information 220 and the second information 225, the UE 115-a and the base station 105-a may perform a recovery procedure 250 (e.g., a beam failure recovery procedure). For example, the first information 220 may indicate the beam failure to the base station 105-a and initiate the recovery procedure 250. In some examples, the first information 220 may be based on a cell on which the beam failure occurred. For example, the UE 115-a and the base station 105-a may communicate over a primary cell and, in some cases, one or more secondary cells. A primary cell may refer to a cell, operating on a primary frequency of a system bandwidth, in which the UE 115-a either performs an initial connection establishment procedure (e.g., a RACH procedure) or initiates a connection re-establishment procedure. A secondary cell may refer to a cell, operating on a secondary frequency of the system bandwidth, which may be configured to support carrier aggregation and may provide additional radio resources for communications between the UE 115-a and the base station 105-a. In some examples, if the beam failure occurred on a primary cell, the first information 220 may be a RACH message (e.g., a RACH msg1) that initiates a RACH procedure to re-establish a connection between the UE 115-a and the base station 105-a. In some examples, if the beam failure occurred on a secondary cell, the first information 220 may be a BFRQ that initiates the RACH procedure. Here, the UE 115-a may transmit the BFRQ on either the primary cell, a different secondary cell, or a different UE beam 245 used to communicate on the secondary cell.

The UE 115-a and the base station 105-a may support enhanced beam failure recovery based on the second information 225 that reduces a likelihood of subsequent beam failures. For example, the base station 105-a may select and indicate one or more new beams for communicating with the UE 115-a (e.g., a new beam pair, a new base station beam 240, a new UE beam 245) based on the second information 225. For instance, if the second information 225 is indicative of the primary contributing factor being interference experienced at the UE 115-a, the base station 105-a select one or more new beams that are associated with a relatively low interference level between the UE 115-a and the base station 105-a. Alternatively, if the second information 225 is indicative of the primary contributing factor being noise experienced at the UE 115-a, the base station 105-a may select one or more new beams that are associated with a higher signal strength than a signal strength associated with the beam failure (e.g., one or more beams associated with a strongest signal strength of a set of candidate beams) in order to reduce the effects of noise. In some examples, the recovery procedure 250 may include both of performing a RACH procedure and selecting and indicating the one or more new beams.

In some examples, the base station 105-a may configure the UE 115-a with one or more parameters associated with determining and/or reporting beam failure reasons. For example, the base station 105-a may transmit a configuration message 230-a (e.g., via RRC signaling) that includes a set of parameters associated with the generation and reporting of the second information 225. In some examples, the set of parameters may include a set of contributing factors that are capable of causing beam failure. For example, the set of parameters may indicate that the contributing factors that are capable of causing beam failure are interference and noise. In some cases, the set of parameters may include an indication of a procedure for determining the beam failure reason. For example, the set of parameters may indicate that the UE 115-a is to determine the beam failure reason based on consecutive BFIs or based on one or more channel measurements of the BFD-RSs 215. In some examples, the set of parameters may include the threshold quantity of consecutive BFIs, the threshold value of the consecutive BFI counter, the threshold total quantity of consecutive BFIs, or a combination thereof. In some cases, the set of parameters may include information for determining the reason of the beam failure based on the one or more channel measurements. For example, the set of parameters may include a lookup table for mapping channel measurements to contributing factors or a function for mapping channel measurements to contributing factors.

In some examples, the set of parameters may include a reporting configuration for reporting the second information 225. For example, the UE 115-a may be configured to transmit the second information 225 based on the cell on which the beam failure occurred. In some cases, if the beam failure occurred on a primary cell, the UE 115-a may be configured to transmit the second information 225 to the base station 105-a after completion of a RACH procedure initiated by the first information 220. In some cases, if the beam failure occurred on a primary cell, the UE 115-a may be configured to transmit the second information 225 to the base station 105-a in a RACH msg1 (e.g., with the first information 220). In some cases, if the beam failure occurred on a secondary cell, the UE 115-a may be configured to transmit the second information 225 to the base station 105-a in a BFRQ (e.g., with the first information 220). In some examples, the UE 115-a may be configured to transmit the second information 225 via a MAC-control element (MAC-CE), uplink control information (UCI) signaling, or a combination thereof, on the primary cell, the secondary cell, or a different secondary cell. The reporting configuration included in the set of parameters may indicate how the UE 115-a is to transmit the second information 225.

In some examples, the set of parameters may include multiple different options for one or more of the parameters. For example, the set of parameters may include multiple sets of contributing factors, multiple procedures for determining the beam failure reasons, multiple threshold quantities of consecutive BFIs, multiple threshold values of the consecutive BFI counter, multiple threshold total quantities of consecutive BFIs, multiple lookup tables, multiple functions, multiple reporting configurations, or a combination thereof. Here, the base station 105-a may transmit a MAC-CE or downlink control information (DCI) (not shown) that indicates which option (e.g., for each parameters that includes multiple different options) of a parameter to use.

In some examples, the UE 115-a may transmit a parameter request 235 (e.g., via RRC signaling) that requests to change one or more parameters of the set of parameters. The base station 105-a may receive the parameter request 235, update the set of parameters in accordance with the parameter request 235, and transmit a configuration message 230-b (e.g., via RRC signaling) that includes the updated set of parameters.

Figure 3:
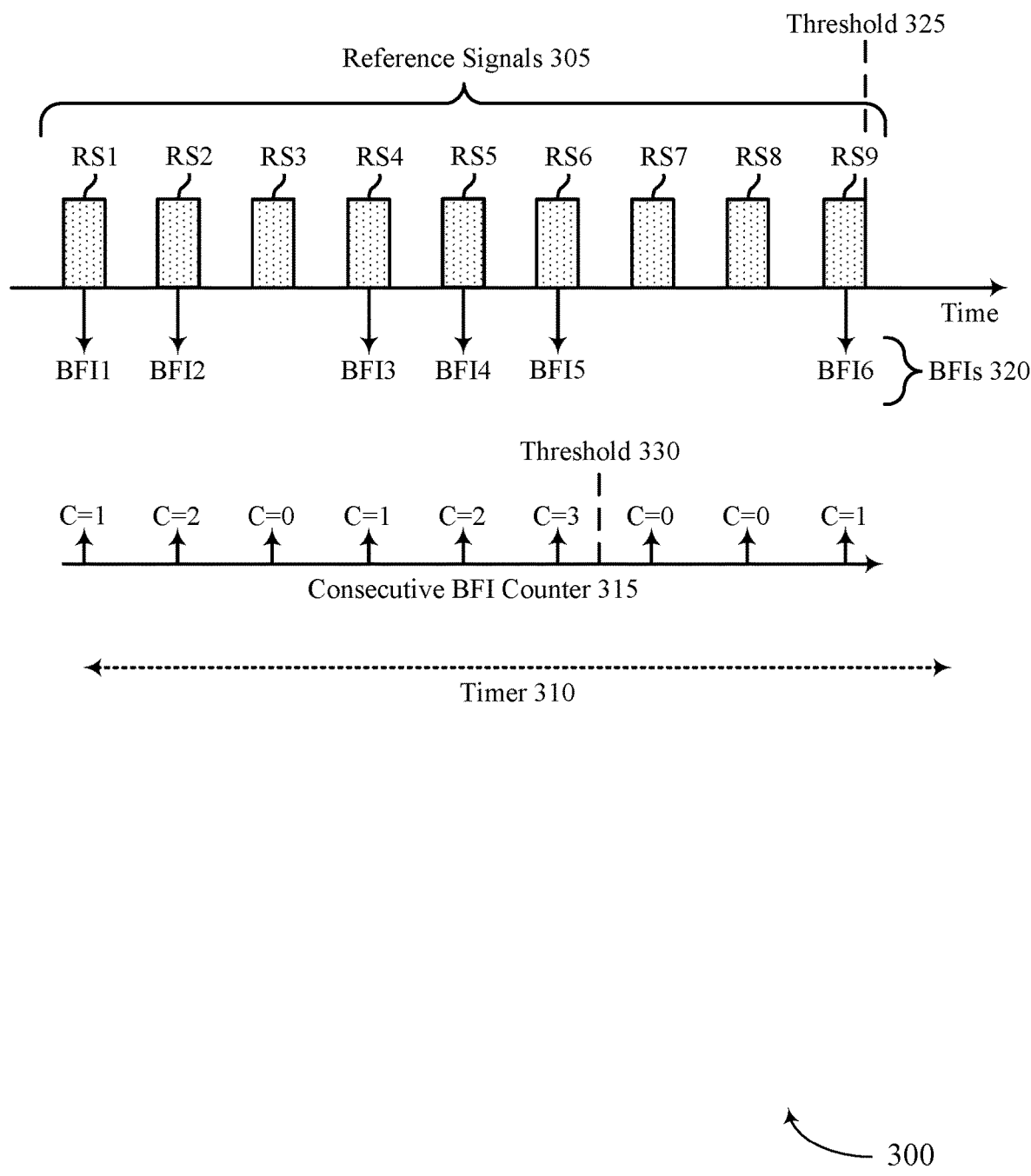
FIGS. 3, 4A, and 4B illustrate examples of determination procedures that support beam failure reason determining and reporting in accordance with aspects of the present disclosure.

FIG. 3 illustrates an example of a determination procedure 300 that supports beam failure reason determining and reporting in accordance with aspects of the present disclosure. The determination procedure 300 may implement aspects of the wireless communications systems 100 and 200 or may be implemented by aspects of the wireless communications system 100 and 200 as described with reference to FIGS. 1 and 2, respectively. For example, the determination procedure 300 may be implemented by a UE 115 and a base station 105 to support beam failure reason determining and reporting based on consecutive BFIs 320.

The determination procedure 300 depicts reference signals 305 that may be transmitted by the base station 105 to the UE 115 to enable beam failure detection. For example, the reference signals 305 may include reference signals RS1, RS2, RS3, RS4, RS5, RS6, RS7, RS8, and RS9, which may be examples of BFD-RSs. The base station 105 may periodically transmit each reference signal 305 in a respective beam measurement opportunity.

The UE 115 may generate BFIs 320 in response to receiving the reference signals 305. For example, for each reference signal 305, the UE 115 may determine whether to generate a BFI 320 corresponding to the reference signal 305 (e.g., based on an estimated BLER of the reference signal 305). In the example of FIG. 3, the UE 115 may generate a BFI1 corresponding to RS1, a BFI2 corresponding to RS2, a BFI3 corresponding to RS3, a BFI4 corresponding to RS4, a BFI5 corresponding to RS5, and a BFI6 corresponding to RS6.

The UE 115 may initiate a timer 310 in response to generating the BFI1 and may determine whether beam failure occurs based on the quantity of BFIs 320 generated within a duration of the timer 310. For example, the UE 115 may be configured with a threshold 325 corresponding to a threshold quantity of BFIs 320 that indicates an occurrence of beam failure. If the UE 115 generates at least the threshold quantity of BFIs 320 (e.g., six BFIs 320, or some other quantity of BFIs 320) before an expiration of the timer 310, the UE 115 may determine that beam failure has occurred. Accordingly, in the example of FIG. 3, the UE 115 may determine that beam failure has occurred based on generating six BFIs 320 (e.g., BFI1 through BFI6) before an expiration of the timer 310.

The UE 115 may additionally determine a reason of the beam failure based on a quantity of consecutive BFIs 320 generated by the UE 115. Consecutive BFIs 320 may correspond to BFIs 320 that are generated for consecutively received reference signals 305 in the time domain. To track a quantity of consecutive BFIs 320, the UE 115 may increment a value C of a consecutive BFI counter 315 (e.g., at a MAC layer at the UE 115) for each BFI 320 generated by the UE 115 (e.g., and reported to the MAC layer). Additionally, the UE 115 may reset the value C of consecutive BFI counter 315 to zero each time that a BFI 320 is not generated for a corresponding reference signal 305. For example, the UE 115 may increment C in response to generating the BFI1, the BFI2, the BFI3, the BFI4, the BFI5, and the BFI6, and may reset C each time that a BFI 320 is not generated. For instance, the UE 115 may generate BFI1 and increment C to 1 and generate BFI2 and increment C to 2. However, the UE 115 may not generate a BFI 320 in response to receiving RS3, and therefore may reset C to 0. Additionally, the UE 115 may generate BFI3 and increment C to 1; generate BFI4 and increment C to 2; generate BFI5 and increment C to 3; reset C to 0 in based on not generating a BFI 320 in response to receiving RS7 and RS8; and generate BFI6 and increment C to 1. Accordingly, a greatest value of the consecutive BFI counter 315 may be 3 and a total quantity of consecutive BFIs 320 may be 5 (e.g., corresponding to consecutive BFIs BFI1 and BFI2 and consecutive BFIs BFI3, BFI4, and BFI5).

In some examples, the UE 115 may determine the reason of the beam failure based on the greatest value of the consecutive BFI counter 315. For example, the UE 115 may be configured with a threshold 330, which, in some cases, may correspond to a threshold value of the consecutive BFI counter 315 that may be used to determine the reason of the beam failure. For example, if greatest value of the consecutive BFI counter 315 satisfies (e.g., meets or exceeds) the threshold 330, the UE 115 may determine that a primary contributing factor to the beam failure is interference experienced at the UE 115. Alternatively, if the greatest value of the consecutive BFI counter 315 fails to satisfy (e.g., is less than, is less than or equal to) the threshold 330, the UE 115 may determine that the primary contributing factor to the beam failure is noise experienced at the UE 115.

In some examples, the UE 115 may determine the reason of the beam failure based on the total quantity of consecutive BFIs 320. For example, the threshold 330 may correspond to a threshold total quantity of consecutive BFIs 320 that may be used to determine the reason of the beam failure. For instance, if total quantity of consecutive BFIs 320 satisfies (e.g., meets or exceeds) the threshold 330, the UE 115 may determine that a primary contributing factor to the beam failure is interference experienced at the UE 115. Alternatively, if the total quantity of consecutive BFIs 320 fails to satisfy (e.g., is less than, is less than or equal to) the threshold 330, the UE 115 may determine that the primary contributing factor to the beam failure is noise experienced at the UE 115. In some examples, the UE 115 may determine the reason of the beam failure based on a ratio of the total quantity of consecutive BFIs 320 to the total quantity of generated BFIs 320. For example, the threshold 330 may correspond to a threshold ratio, which, if satisfied, may indicate that the primary contributing factor is interference experienced at the UE 115, and, if not satisfied, may indicate that the primary contributing factor is noise experienced at the UE 115.

The UE 115 may generate second information that is indicative of the reason of the beam failure and may transmit the second information to the base station 105. For example, the UE 115 may indicate, via the second information, the determined reason of the beam failure (e.g., the primary contributing factor to the beam failure, a secondary contributing factor to the beam failure). Alternatively, the UE 115 may indicate, via the second information, the greatest value of the consecutive BFI counter 315, whether the greatest value of the consecutive BFI counter 315 satisfies the threshold 330, the total quantity of consecutive BFIs 320, whether the total quantity of consecutive BFIs 320 satisfies the threshold 330, the ratio of the total quantity of consecutive BFIs 320 to the total quantity of generated BFIs 320, or whether the ratio of the total quantity of consecutive BFIs 320 to the total quantity of generated BFIs 320 satisfies the threshold 330. Here, the base station 105 may use the second information to determine the reason of the beam failure.

Figure 4A:
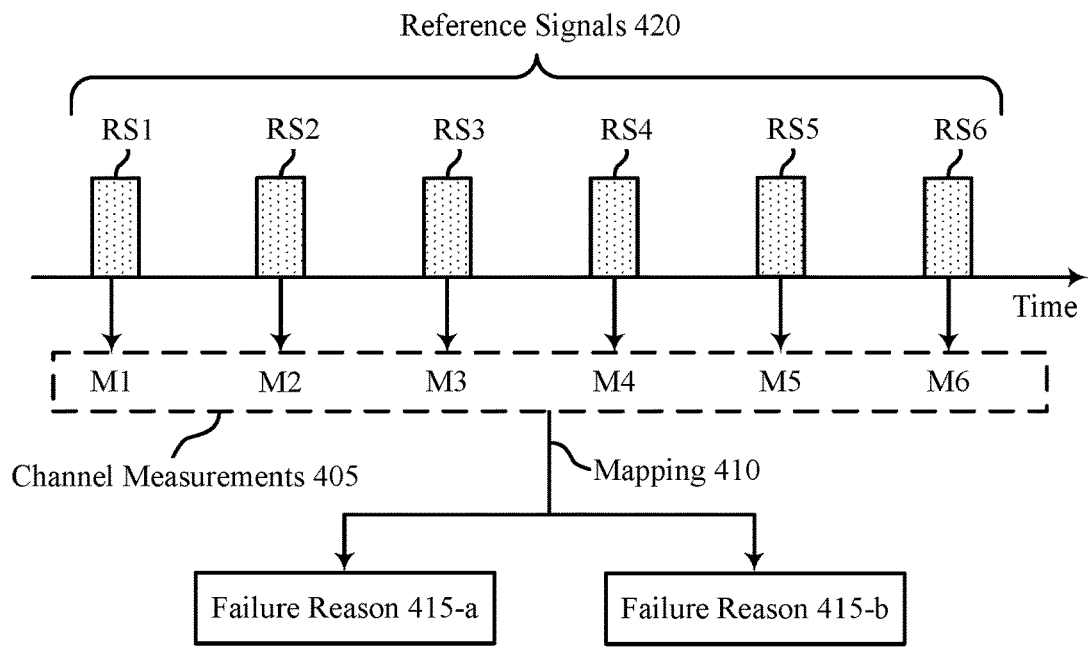

FIG. 4A illustrates an example of a determination procedure 400-a that supports beam failure reason determining and reporting in accordance with aspects of the present disclosure. The determination procedure 400-a may implement aspects of the wireless communications systems 100 and 200 or may be implemented by aspects of the wireless communications system 100 and 200 as described with reference to FIGS. 1 and 2, respectively. For example, the determination procedure 400-a may be implemented by a UE 115 and a base station 105 to support beam failure reason determining and reporting based on measurements of BFD-RSs.

The determination procedure 400-a depicts reference signals 420 that may be transmitted by the base station 105 to the UE 115 to enable beam failure detection. For example, the reference signals 420 may include reference signals RS1, RS2, RS3, RS4, RS5, and RS6, which may be examples of BFD-RSs. The base station 105 may periodically transmit each reference signal 420 in a respective beam measurement opportunity. In the example of FIG. 4A, the UE 115 may determine that beam failure has occurred based on the reference signals 420 (e.g., based on a quantity of BFIs generated in response to receiving the reference signals 420 satisfying a threshold).

The UE 115 may additionally determine a reason of the beam failure based on performing channel measurements 405 on the reference signals 420. For example, the UE 115 may perform a measurement M1 on RS1, a measurement M2 on R2, a measurement M3 on RS3, a measurement M4 on R4, a measurement M5 on RS5, and a measurement M6 on R6. In some examples, each of the channel measurements 405 may include measuring an SINR, an SNR, an RSRP, or a combination thereof, of each reference signal 420. The UE 115 may be configured with a mapping 410 to determine a failure reason 415 of the beam failure based on the channel measurements 405.

In some examples, the mapping 410 may be a lookup table for mapping the channel measurements 405 to failure reasons 415. For example, the lookup table may map the channel measurements 405 to a failure reason 415-a corresponding to interference experienced at the UE 115 or to a failure reason 415-b corresponding to noise experienced at the UE 115. For instance, the lookup table may map a quantity of SINRs of the measured SINRs that are less than a threshold SINR exceeding a first threshold quantity, a quantity of SNRs of the measured SNRs that exceed a threshold SNR exceeding a second threshold quantity, a quantity of RSRPs of the measured RSRPs that exceed a threshold RSRP exceeding a third threshold quantity, or a combination thereof, to the failure reason 415-a. Alternatively, the lookup table may map a quantity of SINRs of the measured SINRs that are less than a threshold SINR being less than the first threshold quantity, a quantity of SNRs of the measured SNRs that exceed a threshold SNR being less than the second threshold quantity, a quantity of RSRPs of the measured RSRPs that exceed a threshold RSRP being less than the third threshold quantity, or a combination thereof, to the failure reason 415-b.

In some examples, the mapping 410 may be a function for mapping the channel measurements 405 to the failure reasons 415. For example, the function may map the channel measurements 405 to the failure reason 415-a or to the failure reason 415-b. A first example function for mapping the channel measurements 405 to the failure reasons 415 may be as follows:

$$f = \Sigma_{BFD\text{-}RS\ occasions} a(\text{SNR}-Ts) + b(Tsi-\text{SINR}) \qquad (1)$$

where a and b are positive integers, Ts is a threshold SNR, Tsi is a threshold SINR, SNR is a measured SNR of a channel measurement 405 (e.g., the measured SNR of M1, M2, M3, M4, M5, M6), and SINR is a measured SINR of a channel measurement 405 (e.g., the measured SINR of M1, M2, M3, M4, M5, M6). Here, f being greater than (e.g., greater than or equal to) a configured value $f_o$ may map to the failure reason 415-a, and f being less than (e.g., less than or equal to) $f_o$ may map to the failure reason 415-b.

A second example function for mapping the channel measurements 405 to the failure reasons 415 may be as follows:

$$f = \Sigma_{BFD\text{-}RS\ occasions} a(\text{RSRP}-Tr) + b(Tsi-\text{SINR}) \qquad (2)$$

where a and b are positive integers, Tr is a threshold RSRP, Tsi is a threshold SINR, RSRP is a measured RSRP of a channel measurement 405 (e.g., the measured RSRP of M1, M2, M3, M4, M5, M6), and SINR is a measured SINR of a channel measurement 405 (e.g., the measured SINR of M1, M2, M3, M4, M5, M6). Here, f being greater than (e.g., greater than or equal to) $f_o$ may map to the failure reason 415-a, and f being less than (e.g., less than or equal to) $f_o$ may map to the failure reason 415-b.

The UE 115 may generate second information that is indicative of the reason of the beam failure and may transmit the second information to the base station 105. For example, the UE 115 may indicate, via the second information, the failure reason 415 determined based on the mapping 410. Alternatively, the UE 115 may indicate, via the second information, the channel measurements 405 to the base station 105. Here, the base station 105 may use the channel measurements 405 to determine the reason of the beam failure using the mapping 410.

Figure 4B:
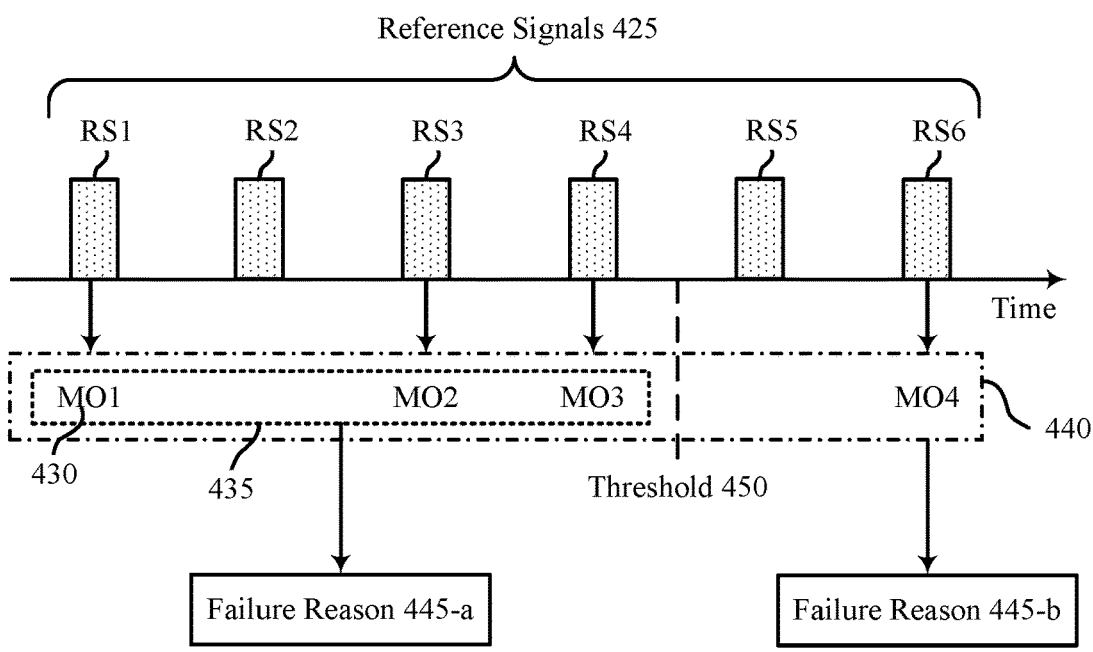

FIG. 4B illustrates an example of a determination procedure 400-b that supports beam failure reason determining and reporting in accordance with aspects of the present disclosure. The determination procedure 400-b may implement aspects of the wireless communications systems 100 and 200 or may be implemented by aspects of the wireless communications system 100 and 200 as described with reference to FIGS. 1 and 2, respectively. For example, the determination procedure 400-b may be implemented by a UE 115 and a base station 105 to support beam failure reason determining and reporting based on measurements of BFD-RSs.

The determination procedure 400-b depicts reference signals 425 that may be transmitted by the base station 105 to the UE 115 to enable beam failure detection. For example, the reference signals 425 may include reference signals RS1, RS2, RS3, RS4, RS5, and RS6, which may be examples of BFD-RSs. The base station 105 may periodically transmit each reference signal 425 in a respective beam measurement opportunity. In the example of FIG. 4B, the UE 115 may determine that beam failure has occurred based on the reference signals 425 (e.g., based on a quantity of BFIs generated in response to receiving the reference signals 425 satisfying a threshold).

The UE 115 may additionally determine a reason of the beam failure based on performing channel measurements on the reference signals 425. For example, the UE 115 may perform one or more channel measurements on each of the reference signals 425 (e.g., measure an SINR, an SNR, an RSRP, or a combination thereof, for each reference signal 425) and may determine measurement occasions 430 corresponding one or more of the reference signals 425. In some examples, a measurement occasion 430 may correspond to a measured SINR of a reference signal 425 being less than a threshold SINR and a measured SNR of the reference signal 425 exceeding a threshold SNR. In some examples, a measurement occasion 430 may correspond to a measured SINR of a reference signal 425 being less than a threshold SINR and a measured RSRP of the reference signal 425 exceeding a threshold RSRP. The UE 115 may determine a failure reason 415 of the beam failure based on a quantity of determined measurement occasions 430.

For example, the example of FIG. 4B depicts a first example in which the UE 115 determines a first quantity of measurement occasions 430 corresponding to a quantity 435. For instance, the UE 115 may determine a measurement occasion MO1 corresponding to RS1, a measurement occasion MO2 corresponding to RS3, and a measurement occasion MO3 corresponding to RS4. In this example, the UE 115 may not determine a measurement occasion 430 for RS2, RS5, and RS6. The UE 115 may determine a failure reason 415 based on whether the quantity 435 satisfies (e.g., meets, exceeds) a threshold 450. For instance, the base station 105 may configure the UE 115 with the threshold 450 such that if a determined quantity of measurement occasions 430 fails to satisfy (e.g., is less than, is less than or equal to) the threshold 450, the UE 115 may determine that the reason of the beam failure corresponds to a failure reason 445-a, which may correspond to noise experienced at the UE 115. Alternatively, if the determined quantity of measurement occasions 430 satisfies the threshold 450, the UE 115 may determine that the reason of the beam failure corresponds to a failure reason 445-b, which may correspond to interference experienced at the UE 115. The UE 115 may determine that the quantity 435 fails to satisfy the threshold 450 and may thus determine that the reason of the beam failure is failure reason 445-a.

The example of FIG. 4B depicts a second example in which the UE 115 determines a second quantity of measurement occasions 430 corresponding to a quantity 440. For instance, the UE 115 may determine a measurement occasion MO1 corresponding to RS1, a measurement occasion MO2 corresponding to RS3, a measurement occasion MO3 corresponding to RS4, and a measurement occasion MO4 corresponding to RS6. Here, the quantity 440 may satisfy the threshold 450, and thus the UE 115 may determine that the reason of the beam failure is failure reason 445-b.

The UE 115 may generate second information that is indicative of the reason of the beam failure and may transmit the second information to the base station 105. For example, the UE 115 may indicate, via the second information, the failure reason 445 determined based on the determined quantity of measurement occasions 430. Alternatively, the UE 115 may indicate, via the second information, the determined quantity of measurement occasions 430 to the base station 105. Here, the base station 105 may determine the reason of the beam failure based on whether the determined quantity of measurement occasions 430 satisfies the threshold 450.

Figure 5:
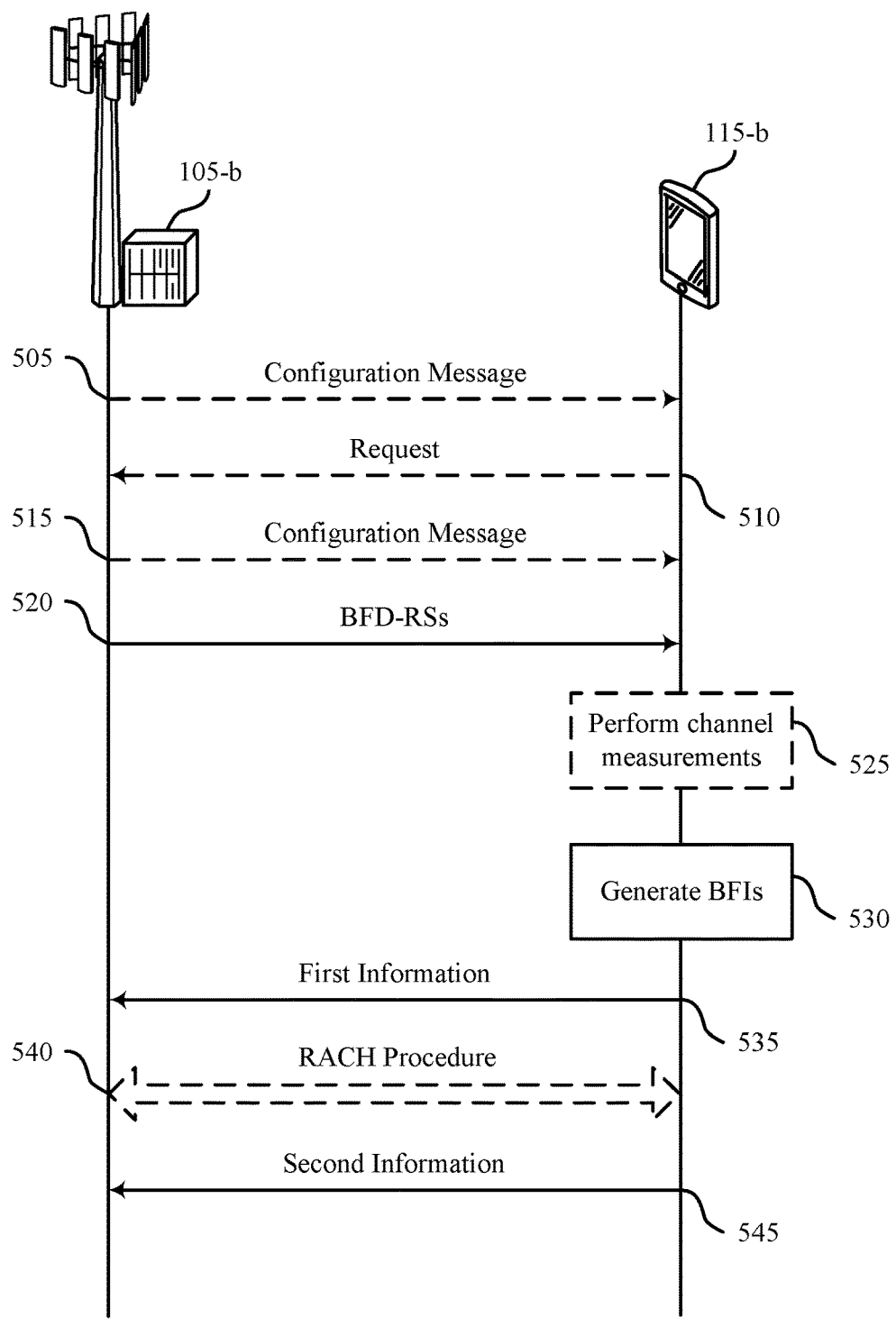
FIG. 5 illustrates an example of a process flow that supports beam failure reason determining and reporting in accordance with aspects of the present disclosure.

FIG. 5 illustrates an example of a process flow 500 that supports beam failure reason determining and reporting in accordance with aspects of the present disclosure. The process flow 500 may implement aspects of the wireless communications systems 100 and 200 or may be implemented by aspects of the wireless communications system 100 and 200 as described with reference to FIGS. 1 and 2, respectively. For example, the process flow 500 may be implemented by a UE 115-b and a base station 105-b to the determination and reporting of a beam failure reason (e.g., or information indicative of a beam failure reason) to reduce the occurrence of beam failure and support improved reliability, latency, data rates, resource utilization, spectral efficiency, coordination between devices, and processing capability, among other benefits.

The base station 105-b and the UE 115-b may be examples of a base station 105 and a UE 115 as described with reference to FIGS. 1 through 4B, respectively. In the following description of the process flow 500, the operations may be performed in different orders or at different times. Some operations may also be omitted from the process flow 500, and other operations may be added to the process flow 500.

At 505, the base station 105-b may transmit a first configuration message (e.g., via RRC signaling) to the UE 115-b. The first configuration message may include a set of parameters that may be used by the UE 115-b to determine and/or report information that is indicative one or more contributing factors to beam failure. For example, the set of parameters may include a set of contributing factors capable of causing the beam failure, a threshold quantity of consecutive BFIs, a threshold value of a consecutive BFI counter, a threshold total quantity of consecutive BFIs, a lookup table for mapping channel measurements to the one or more contributing factors, a function for mapping the channel measurements to the one or more contributing factors, a threshold quantity of measurement occasions, a reporting configuration for reporting the information, or a combination thereof. In some examples, the set of parameters may include multiple options for one or more of the parameters.

At 510, the UE 115-b may transmit a request to the base station 105-b that requests for the base station 105-b to change one or more parameters of the set of parameters. In some examples, the UE 115-b may transmit the request via RRC signaling.

At 515, the base station 105-b may transmit a second configuration message (e.g., via RRC signaling) to the UE 115-b that includes a second set of parameters based on the request. For example, the base station 105-b may update the set of parameters in response to the request and may transmit the updated set of parameters to the UE 115-b, where the second set of parameters corresponds is the updated set of parameters.

At 520, the base station 105-b may transmit a set of BFD-RSs to the UE 115-b over a corresponding set of beam measurement opportunities. For example, the base station 105-b may periodically transmit, and the UE 115-b may receive, BFD-RSs in periodic beam measurement opportunities to enable the UE 115-b to determine whether beam failure has occurred.

At 525, the UE 115-b may perform one or more channel measurements on the set of BFD-RSs. For example, the UE 115-b may measure an SINR, an SNR, an RSRP, or a combination thereof, for each of the received BFD-RSs.

At 530, the UE 115-b may generate a set of BFIs based on the received set of BFD-RSs. For example, the UE 115-b may estimate a BLER of each BFD-RS and may generate a BFI for each BFD-RS that has an estimated BLER that satisfies (e.g., meets, exceeds) a threshold BLER. In some examples, the UE 115-b may estimate the BLER at a physical layer at the UE 115-b and report generated BFIs to a MAC layer at the UE 115-b.

At 535, the UE 115-b may generate and transmit first information to the base station 105-b indicating that beam failure has occurred. For example, the UE 115-b may determine that beam failure has occurred based on the generated BFIs and may transmit the first information to the base station 105-b to indicate the occurrence of the beam failure. In some examples, the first information may be a beam failure report that initiates a beam failure recovery procedure. For example, the first information may initiate a RACH procedure in order to re-establish a connection between the UE 115-b and the base station 105-b. In some examples, the first information may be a RACH msg1 (e.g., to initiate primary cell beam failure recovery). In some examples, the first information may be a BFRQ (e.g., to initiate secondary cell beam failure recovery).

At 540, the UE 115-b and the base station 105-b may perform the RACH procedure to re-establish the connection based on the first information. In some examples, the RACH procedure may be a contention-based RACH procedure (e.g., a four-step RACH procedure). In some examples, the RACH procedure may be a contention-free RACH procedure (e.g., a two-step RACH procedure).

At 545, the UE 115-b may transmit second information to the base station 105-b that is indicative of one or more contributing factors to the beam failure. For example, the UE 115-b may determine the one or more contributing factors based on a quantity of consecutive BFIs included in the generated BFIs or on the one or more channel measurements. In some examples, the second information may include an indication of the one or more contributing factors (e.g., interference experienced at the UE 115-b, noise experienced at the UE 115-b). In some examples, the second information may enable the base station 105-b to determine the one or more contributing factors based on the information included in the second information. In some cases, the UE 115-b may transmit the first information and the second information in a same message. In some cases, the UE 115-b may transmit the second information in a BFRQ (e.g., the BFRQ that includes the first information). In some cases, the UE 115-b may transmit the second information after a completion of the RACH procedure. In some cases, the UE 115-b may transmit the second information in a RACH msg1. In some cases, the UE 115-b may transmit the second information via a MAC-CE or UCI signaling. In some examples, the UE 115-b may transmit the second information in accordance with the reporting configuration included in the set of parameters (e.g., or the updated set of parameters).

In some examples, the base station 105-b may indicate a new beam for communicating with the UE 115-b that is selected based on the second information to reduce or mitigate the one or more contributing factors, thereby decreasing a likelihood that the one or more contributing factors will cause subsequent beam failures.

Figure 6:
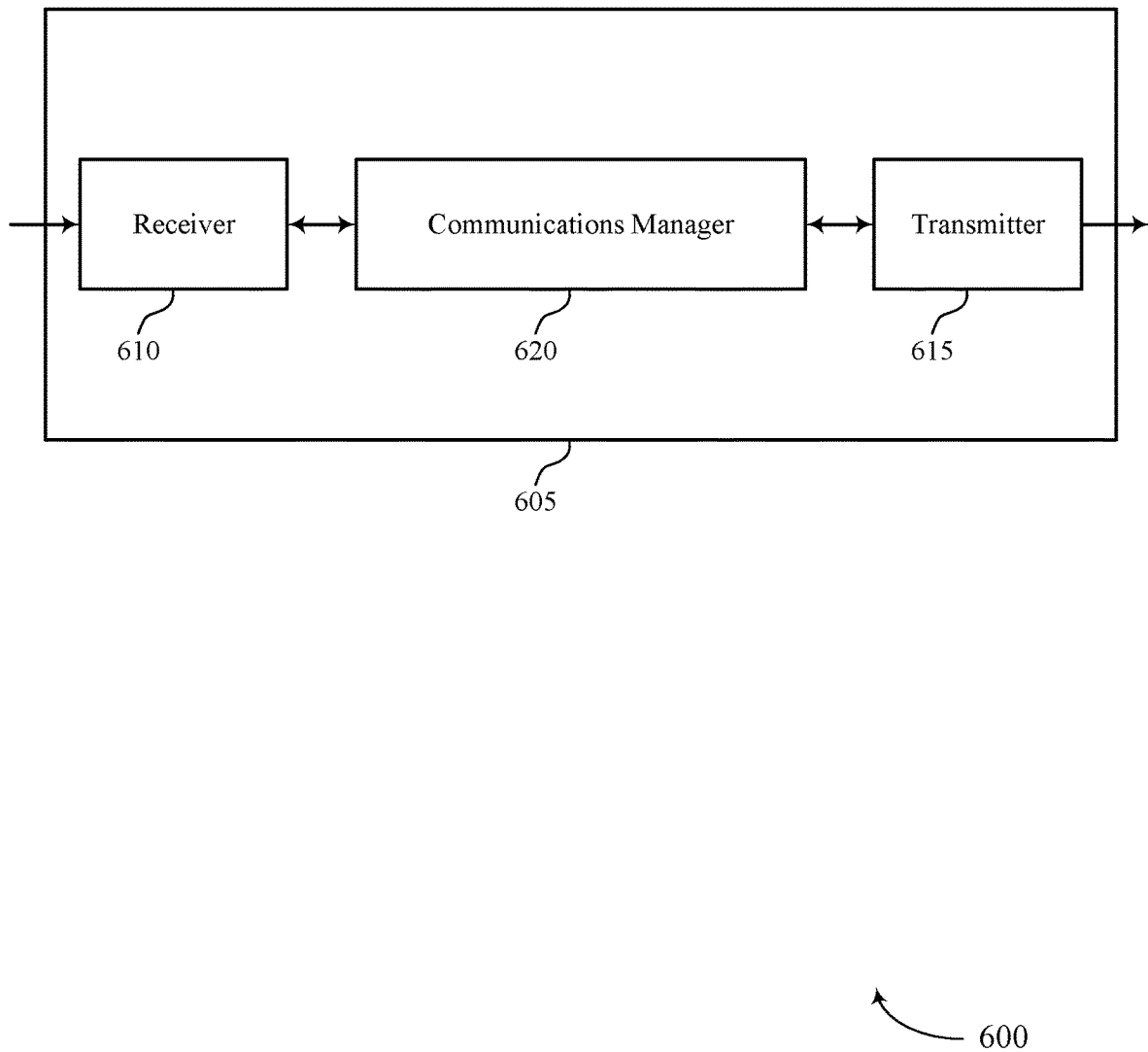
FIGS. 6 and 7 show block diagrams of devices that support beam failure reason determining and reporting in accordance with aspects of the present disclosure.

FIG. 6 shows a block diagram 600 of a device 605 that supports beam failure reason determining and reporting in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam failure reason determining and reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam failure reason determining and reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam failure reason determining and reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a set of multiple reference signals over a set of multiple beam measurement opportunities. The communications manager 620 may be configured as or otherwise support a means for generating a set of BFIs based on the set of multiple reference signals, each BFI of the set of BFIs corresponding to a beam measurement opportunity of the set of multiple beam measurement opportunities. The communications manager 620 may be configured as or otherwise support a means for transmitting, to the base station, first information that is indicative of beam failure occurring based on the set of BFIs satisfying a first threshold and second information that is indicative of one or more contributing factors to the beam failure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources by supporting the determination and reporting of a beam failure reason (e.g., or information indicative of a beam failure reason). For example, indicating a beam failure reason (e.g., or information indicative of a beam failure reason) may enable a base station to select subsequent beam(s) such that beam failure is less likely to occur, thereby reducing processing and resource waste associated with beam failure and beam failure recovery.

Figure 7:
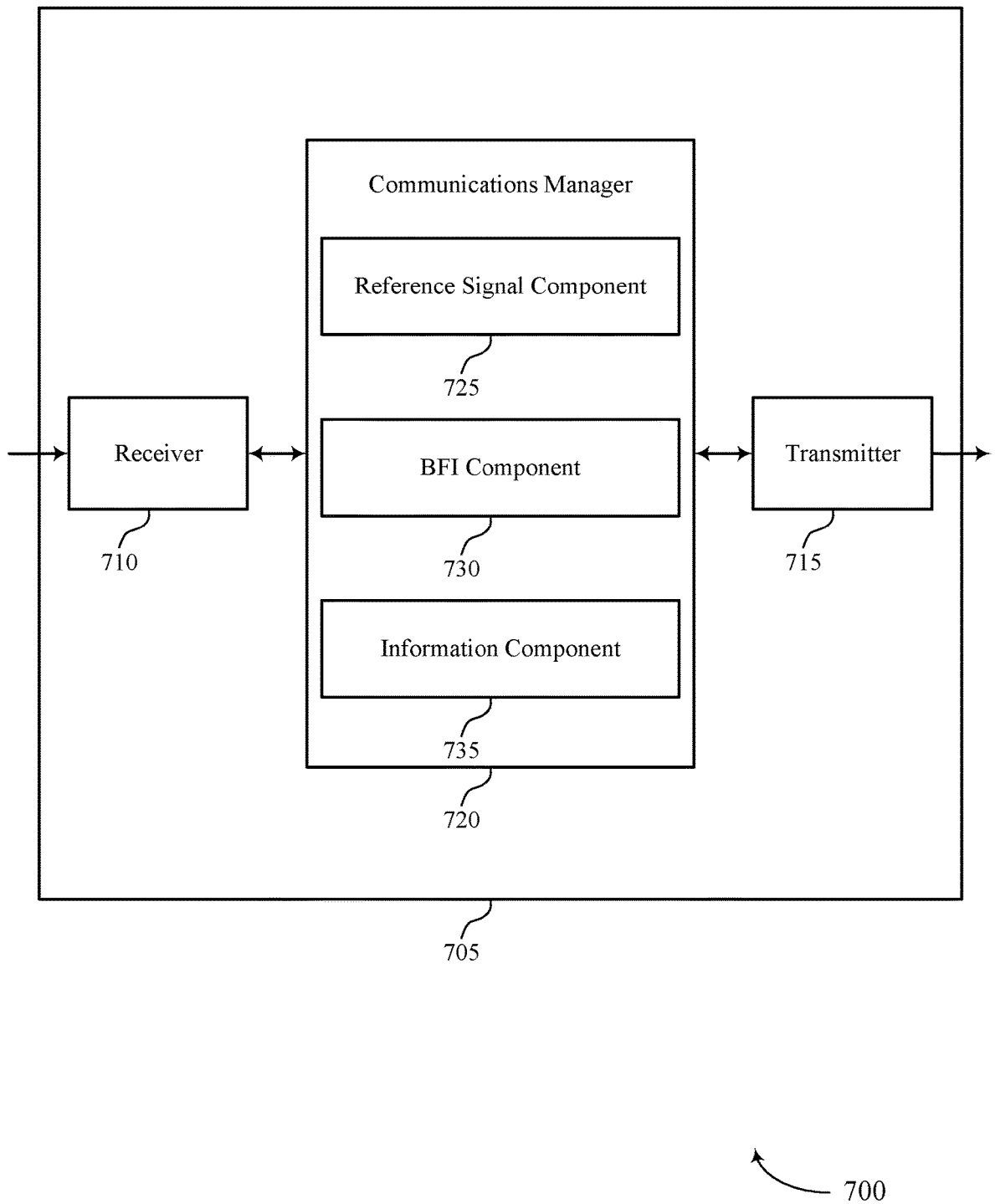

FIG. 7 shows a block diagram 700 of a device 705 that supports beam failure reason determining and reporting in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam failure reason determining and reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam failure reason determining and reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam failure reason determining and reporting as described herein. For example, the communications manager 720 may include a reference signal component 725, a BFI component 730, an information component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The reference signal component 725 may be configured as or otherwise support a means for receiving, from a base station, a set of multiple reference signals over a set of multiple beam measurement opportunities. The BFI component 730 may be configured as or otherwise support a means for generating a set of BFIs based on the set of multiple reference signals, each BFI of the set of BFIs corresponding to a beam measurement opportunity of the set of multiple beam measurement opportunities. The information component 735 may be configured as or otherwise support a means for transmitting, to the base station, first information that is indicative of beam failure occurring based on the set of BFIs satisfying a first threshold and second information that is indicative of one or more contributing factors to the beam failure.

Figure 8:
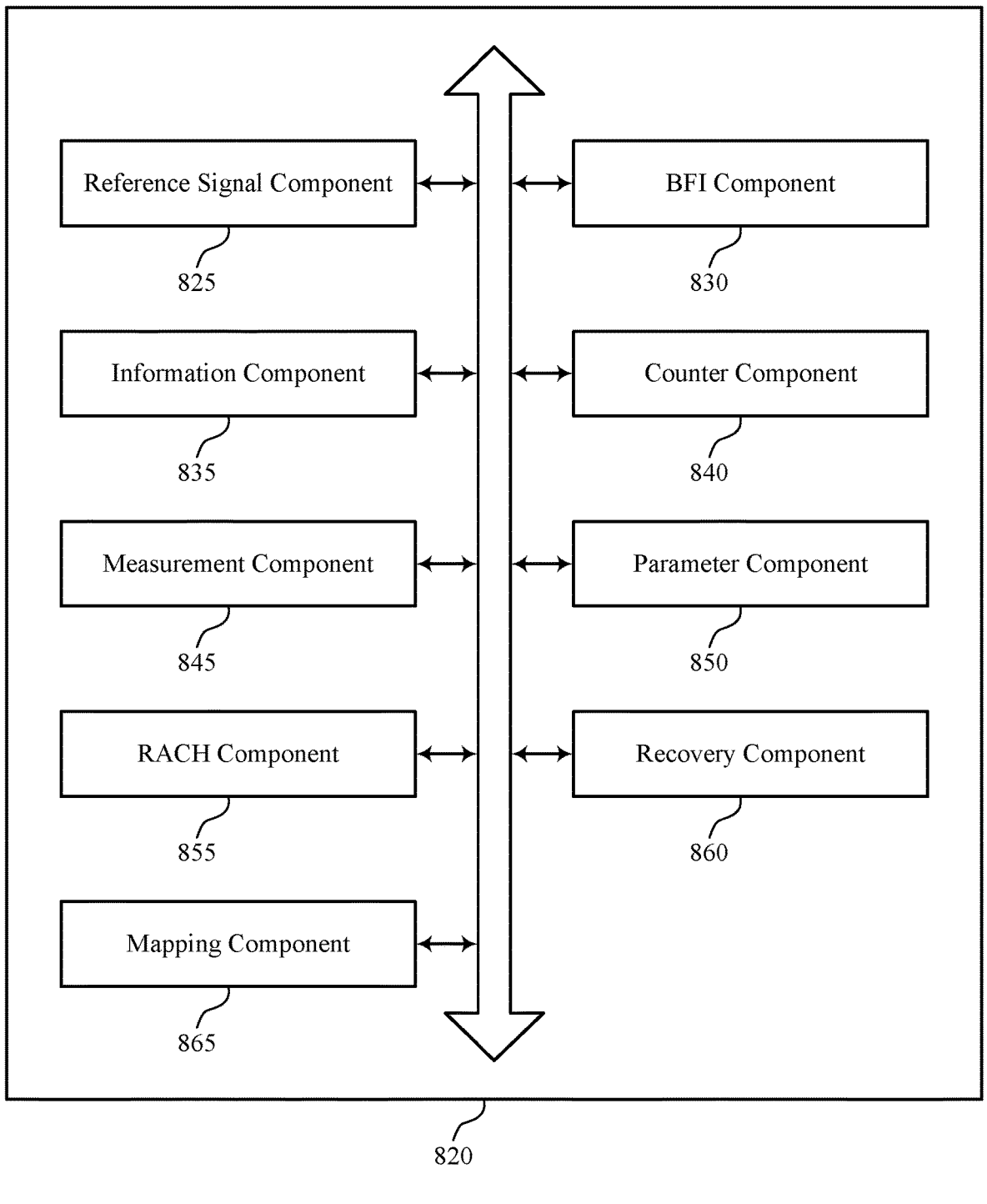
FIG. 8 shows a block diagram of a communications manager that supports beam failure reason determining and reporting in accordance with aspects of the present disclosure.

FIG. 8 shows a block diagram 800 of a communications manager 820 that supports beam failure reason determining and reporting in accordance with aspects of the present disclosure. The communications manager 820 may be an example of aspects of a communications manager 620, a communications manager 720, or both, as described herein. The communications manager 820, or various components thereof, may be an example of means for performing various aspects of beam failure reason determining and reporting as described herein. For example, the communications manager 820 may include a reference signal component 825, a BFI component 830, an information component 835, a counter component 840, a measurement component 845, a parameter component 850, a RACH component 855, a recovery component 860, a mapping component 865, or any combination thereof. Each of these components may communicate, directly or indirectly, with one another (e.g., via one or more buses).

The communications manager 820 may support wireless communication at a UE in accordance with examples as disclosed herein. The reference signal component 825 may be configured as or otherwise support a means for receiving, from a base station, a set of multiple reference signals over a set of multiple beam measurement opportunities. The BFI component 830 may be configured as or otherwise support a means for generating a set of BFIs based on the set of multiple reference signals, each BFI of the set of BFIs corresponding to a beam measurement opportunity of the set of multiple beam measurement opportunities. The information component 835 may be configured as or otherwise support a means for transmitting, to the base station, first information that is indicative of beam failure occurring based on the set of BFIs satisfying a first threshold and second information that is indicative of one or more contributing factors to the beam failure.

In some examples, to support transmitting the second information, the counter component 840 may be configured as or otherwise support a means for transmitting an indication of a value of a consecutive BFI counter, where the indication of the value of the consecutive BFI counter indicates the one or more contributing factors to the beam failure.

In some examples, the second information indicates that the one or more contributing factors include interference experienced at the UE based on a greatest value of the consecutive BFI counter satisfying a second threshold.

In some examples, the second information indicates that the one or more contributing factors include noise experienced at the UE based on a greatest value of the consecutive BFI counter failing to satisfy a second threshold.

In some examples, the second information includes a first indication of whether a greatest value of the consecutive BFI counter satisfies a second threshold or a second indication of the greatest value of the consecutive BFI counter.

In some examples, the second information indicates a total quantity of BFIs of the set of BFIs that correspond to consecutive reference signals of the set of multiple reference signals in a time domain.

In some examples, the measurement component 845 may be configured as or otherwise support a means for performing one or more channel measurements on the set of multiple reference signals, where the second information is based on the one or more channel measurements.

In some examples, the mapping component 865 may be configured as or otherwise support a means for mapping the one or more channel measurements to the one or more contributing factors, where the second information includes an indication of the one or more contributing factors based on the mapping.

In some examples, the second information indicates that the one or more contributing factors include interference experienced at the UE based on a quantity of measurement occasions satisfying a threshold quantity, a measurement occasion of the quantity of measurement occasions corresponding to an SINR for a reference signal of the set of multiple reference signals being less than an SINR threshold and an SNR for the reference signal exceeding an SNR threshold based on the one or more channel measurements.

In some examples, the second information indicates that the one or more contributing factors include noise experienced at the UE based on a quantity of measurement occasions failing to satisfy a threshold quantity, a measurement occasion of the quantity of measurement occasions corresponding to an SINR for a reference signal of the set of multiple reference signals being less than an SINR threshold and an SNR for the reference signal exceeding an SNR threshold based on the one or more channel measurements.

In some examples, the second information indicates that the one or more contributing factors include interference experienced at the UE based on a quantity of measurement occasions satisfying a threshold quantity, a measurement occasion of the quantity of measurement occasions corresponding to an SINR for a reference signal of the set of multiple reference signals being less than an SINR threshold and an RSRP for the reference signal exceeding an RSRP threshold based on the one or more channel measurements.

In some examples, the second information indicates that the one or more contributing factors include noise experienced at the UE based on a quantity of measurement occasions failing to satisfy a threshold quantity, a measurement occasion of the quantity of measurement occasions corresponding to an SINR for a reference signal of the set of multiple reference signals being less than an SINR threshold and an RSRP for the reference signal exceeding an RSRP threshold based on the one or more channel measurements.

In some examples, the second information includes the one or more channel measurements.

In some examples, the one or more channel measurements include an SINR for each of the set of multiple reference signals, an SNR for each of the set of multiple reference signals, an RSRP for each of the set of multiple reference signals, or a combination thereof.

In some examples, the parameter component 850 may be configured as or otherwise support a means for receiving, from the base station, a configuration message including a set of parameters associated with the second information.

In some examples, the set of parameters includes a set of contributing factors capable of causing the beam failure that includes the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

In some examples, the parameter component 850 may be configured as or otherwise support a means for transmitting, to the base station, a request to change one or more parameters of the set of parameters. In some examples, the parameter component 850 may be configured as or otherwise support a means for receiving, from the base station, a second configuration message including a second set of parameters associated with the second information, the second set of parameters corresponding to an updated set of parameters based on the request.

In some examples, the RACH component 855 may be configured as or otherwise support a means for initiating a RACH procedure associated with beam failure recovery based on the set of BFIs satisfying the first threshold, where the second information is transmitted after a completion of the RACH procedure.

In some examples, the second information is transmitted via a MAC-CE, UCI signaling, or a combination thereof.

In some examples, the second information is transmitted via a BFRQ on a primary cell based on the beam failure being associated with communications between the UE and the base station on a secondary cell.

In some examples, the one or more contributing factors include interference experienced at the UE or noise experienced at the UE.

In some examples, the recovery component 860 may be configured as or otherwise support a means for performing a beam failure recovery procedure with the base station based on the first information and the second information.

Figure 9:
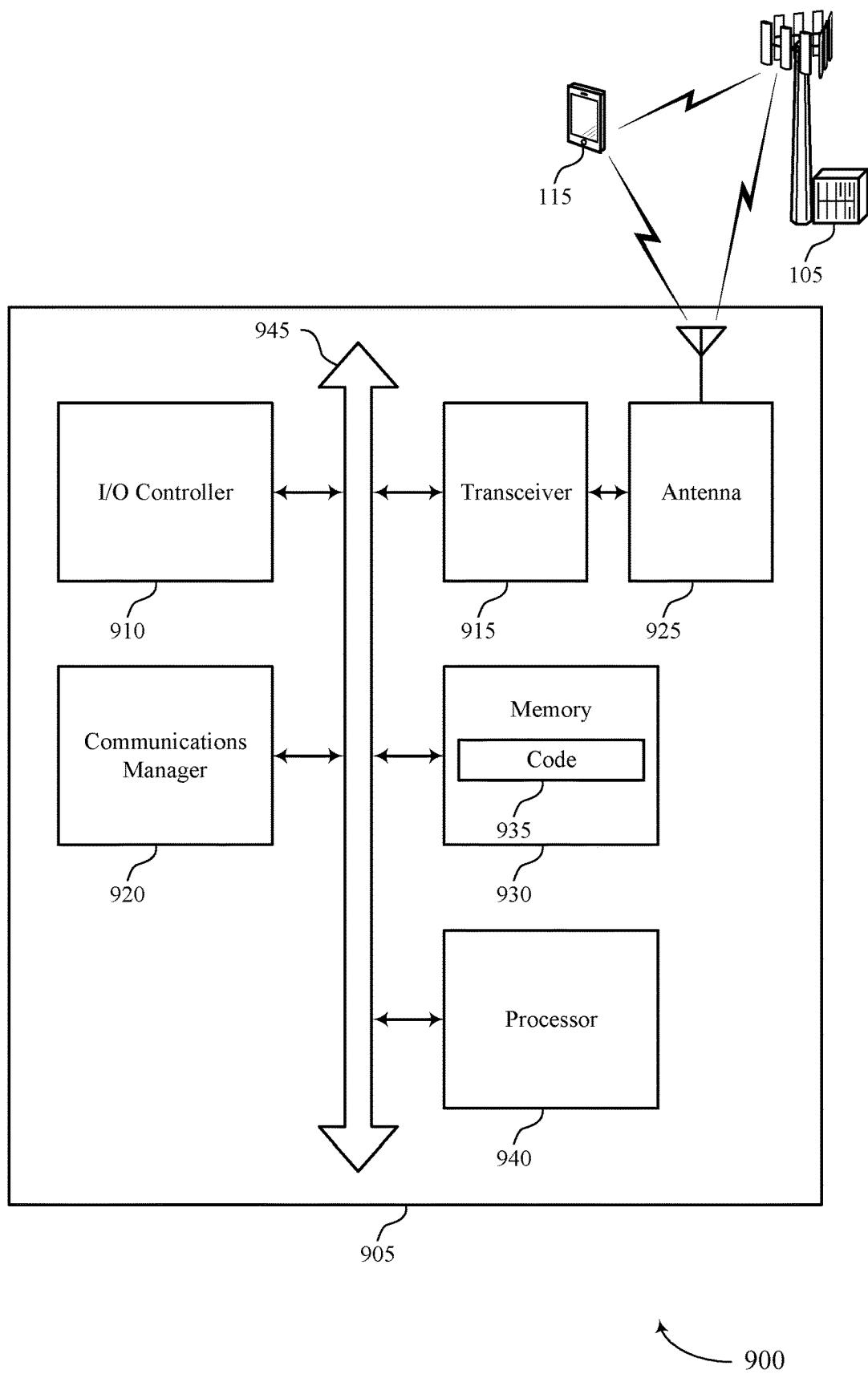
FIG. 9 shows a diagram of a system including a device that supports beam failure reason determining and reporting in accordance with aspects of the present disclosure.

FIG. 9 shows a diagram of a system 900 including a device 905 that supports beam failure reason determining and reporting in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam failure reason determining and reporting). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a set of multiple reference signals over a set of multiple beam measurement opportunities. The communications manager 920 may be configured as or otherwise support a means for generating a set of BFIs based on the set of multiple reference signals, each BFI of the set of BFIs corresponding to a beam measurement opportunity of the set of multiple beam measurement opportunities. The communications manager 920 may be configured as or otherwise support a means for transmitting, to the base station, first information that is indicative of beam failure occurring based on the set of BFIs satisfying a first threshold and second information that is indicative of one or more contributing factors to the beam failure.

By including or configuring the communications manager 920 in accordance with examples as described herein, the device 905 may support techniques for improved reliability, latency, data rates, spectral efficiency, resource usage, coordination between devices, and processing capability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam failure reason determining and reporting as described herein, or the processor 940 and the memory 930 may be otherwise configured to perform or support such operations.

Figure 10:
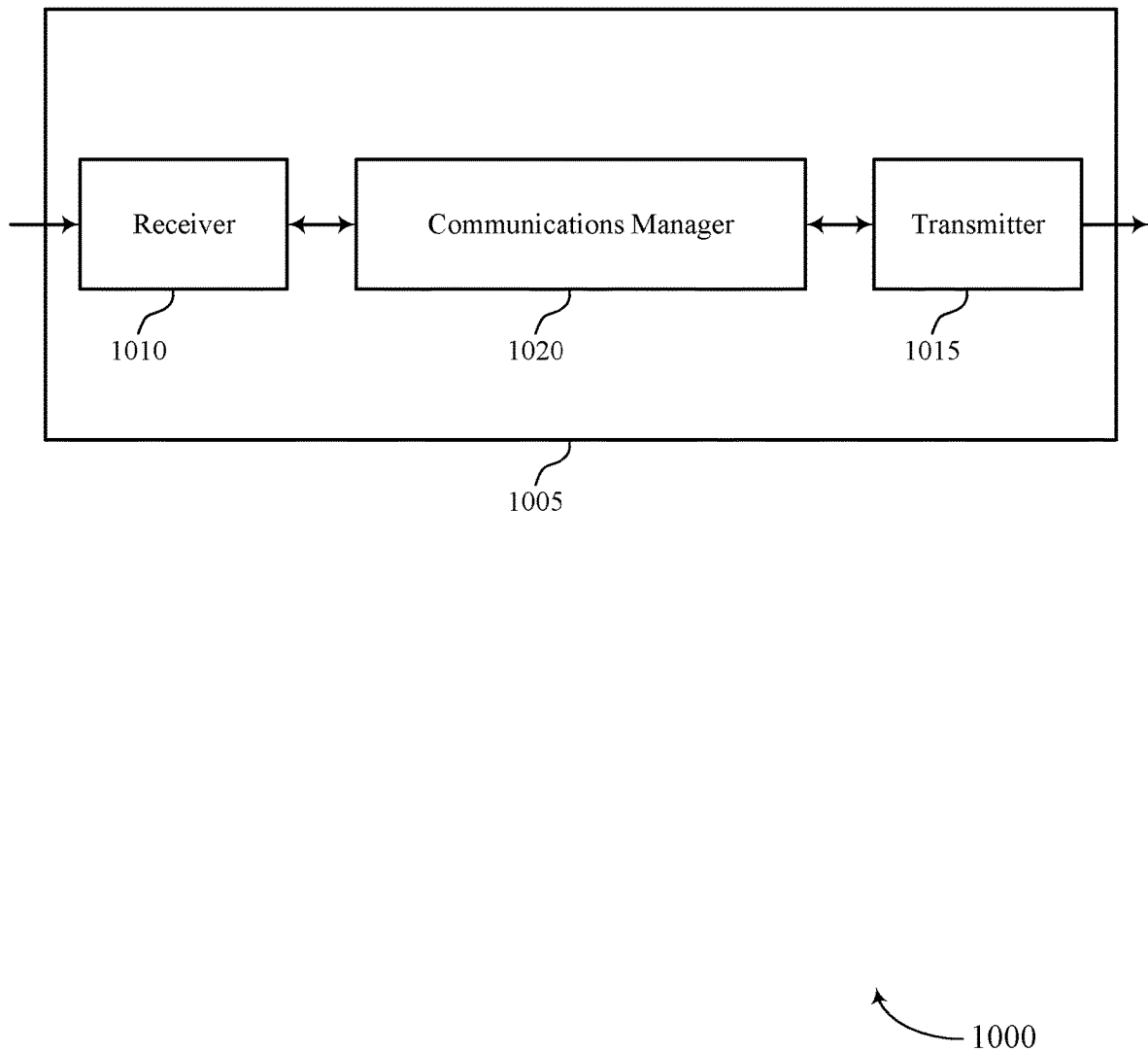
FIGS. 10 and 11 show block diagrams of devices that support beam failure reason determining and reporting in accordance with aspects of the present disclosure.

FIG. 10 shows a block diagram 1000 of a device 1005 that supports beam failure reason determining and reporting in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam failure reason determining and reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam failure reason determining and reporting). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of beam failure reason determining and reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, a set of multiple reference signals over a set of multiple beam measurement opportunities. The communications manager 1020 may be configured as or otherwise support a means for receiving, from the UE, first information that is indicative of beam failure occurring and second information that is indicative of one or more contributing factors to the beam failure.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources by supporting the determination and reporting of a beam failure reason (e.g., or information indicative of a beam failure reason). For example, receiving an indication of a beam failure reason (e.g., or information indicative of a beam failure reason) may enable the device 1005 to select subsequent beam(s) such that beam failure is less likely to occur, thereby reducing process and resource waste associated with beam failure and beam failure recovery.

Figure 11:
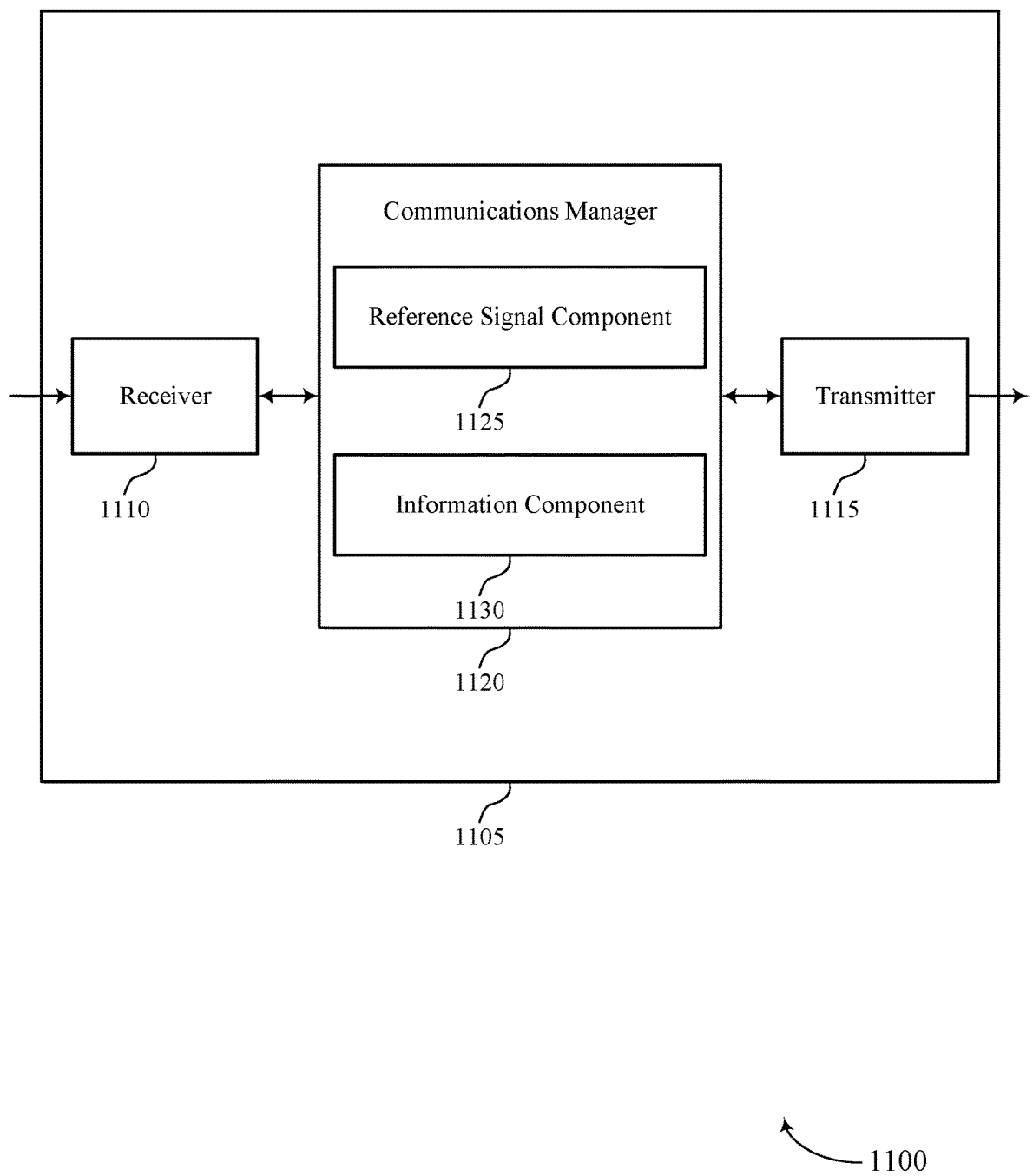

FIG. 11 shows a block diagram 1100 of a device 1105 that supports beam failure reason determining and reporting in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to beam failure reason determining and reporting). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beam failure reason determining and reporting). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of beam failure reason determining and reporting as described herein. For example, the communications manager 1120 may include a reference signal component 1125 an information component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The reference signal component 1125 may be configured as or otherwise support a means for transmitting, to a UE, a set of multiple reference signals over a set of multiple beam measurement opportunities. The information component 1130 may be configured as or otherwise support a means for receiving, from the UE, first information that is indicative of beam failure occurring and second information that is indicative of one or more contributing factors to the beam failure.

Figure 12:
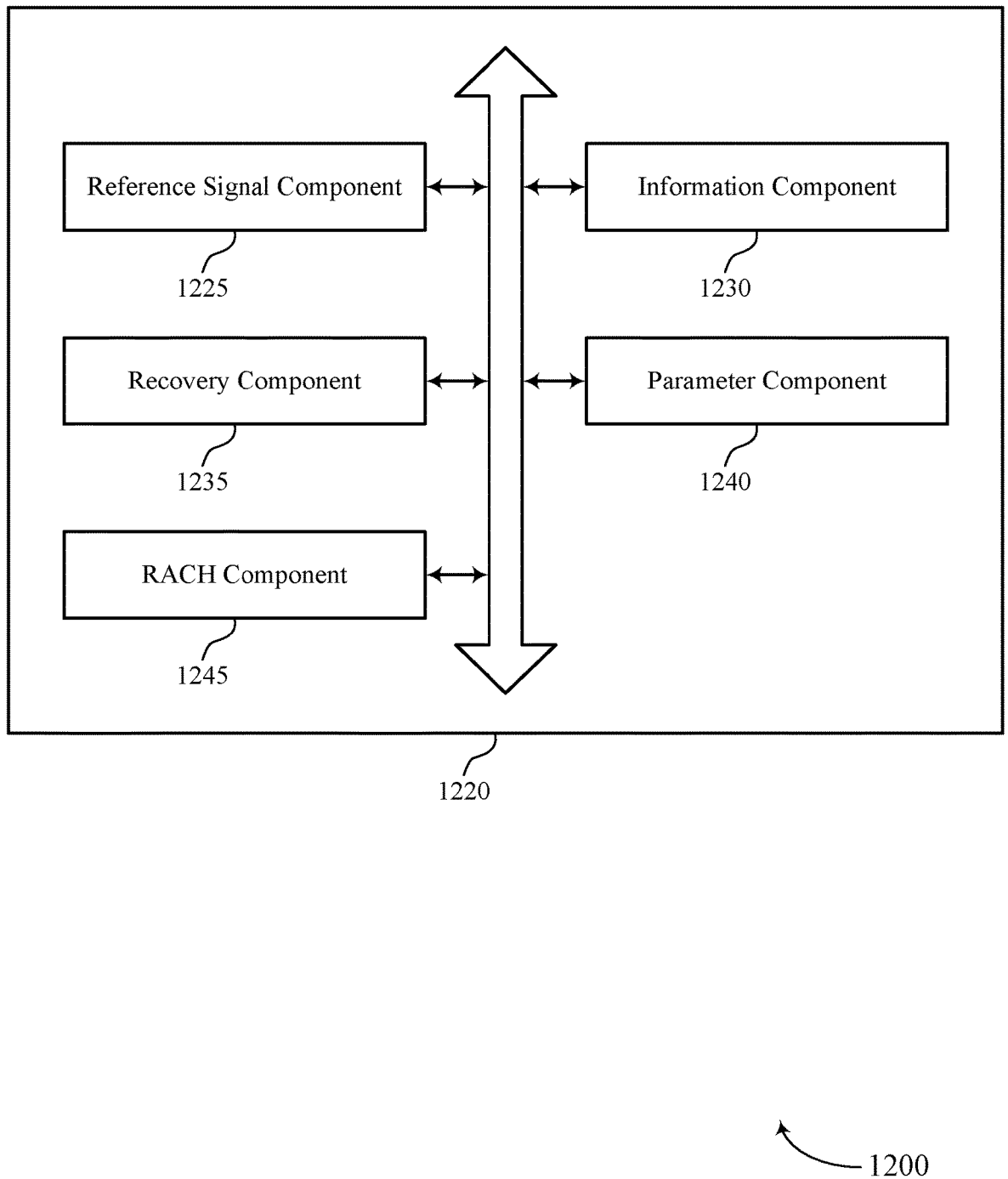
FIG. 12 shows a block diagram of a communications manager that supports beam failure reason determining and reporting in accordance with aspects of the present disclosure.

FIG. 12 shows a block diagram 1200 of a communications manager 1220 that supports beam failure reason determining and reporting in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of beam failure reason determining and reporting as described herein. For example, the communications manager 1220 may include a reference signal component 1225, an information component 1230, a recovery component 1235, a parameter component 1240, a RACH component 1245, or any combination thereof. Each of these components may communicate, directly or indirectly, with one another (e.g., via one or more buses).

The communications manager 1220 may support wireless communication at a base station in accordance with examples as disclosed herein. The reference signal component 1225 may be configured as or otherwise support a means for transmitting, to a UE, a set of multiple reference signals over a set of multiple beam measurement opportunities. The information component 1230 may be configured as or otherwise support a means for receiving, from the UE, first information that is indicative of beam failure occurring and second information that is indicative of one or more contributing factors to the beam failure.

In some examples, the recovery component 1235 may be configured as or otherwise support a means for performing a beam failure recovery procedure with the UE based on the first information and the second information.

In some examples, the second information indicates the one or more contributing factors to the beam failure.

In some examples, the parameter component 1240 may be configured as or otherwise support a means for transmitting, to the UE, a configuration message including a set of parameters associated with the second information.

In some examples, the set of parameters includes a set of contributing factors capable of causing the beam failure that includes the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

In some examples, the parameter component 1240 may be configured as or otherwise support a means for receiving, from the UE, a request to change one or more parameters of the set of parameters. In some examples, the parameter component 1240 may be configured as or otherwise support a means for transmitting, to the UE, a second configuration message including a second set of parameters associated with the second information, the second set of parameters corresponding to an updated set of parameters based on the request.

In some examples, the RACH component 1245 may be configured as or otherwise support a means for performing a RACH procedure associated with beam failure recovery based on the first information, where the second information is received after a completion of the RACH procedure.

In some examples, the one or more contributing factors include interference experienced at the UE or noise experienced at the UE.

Figure 13:
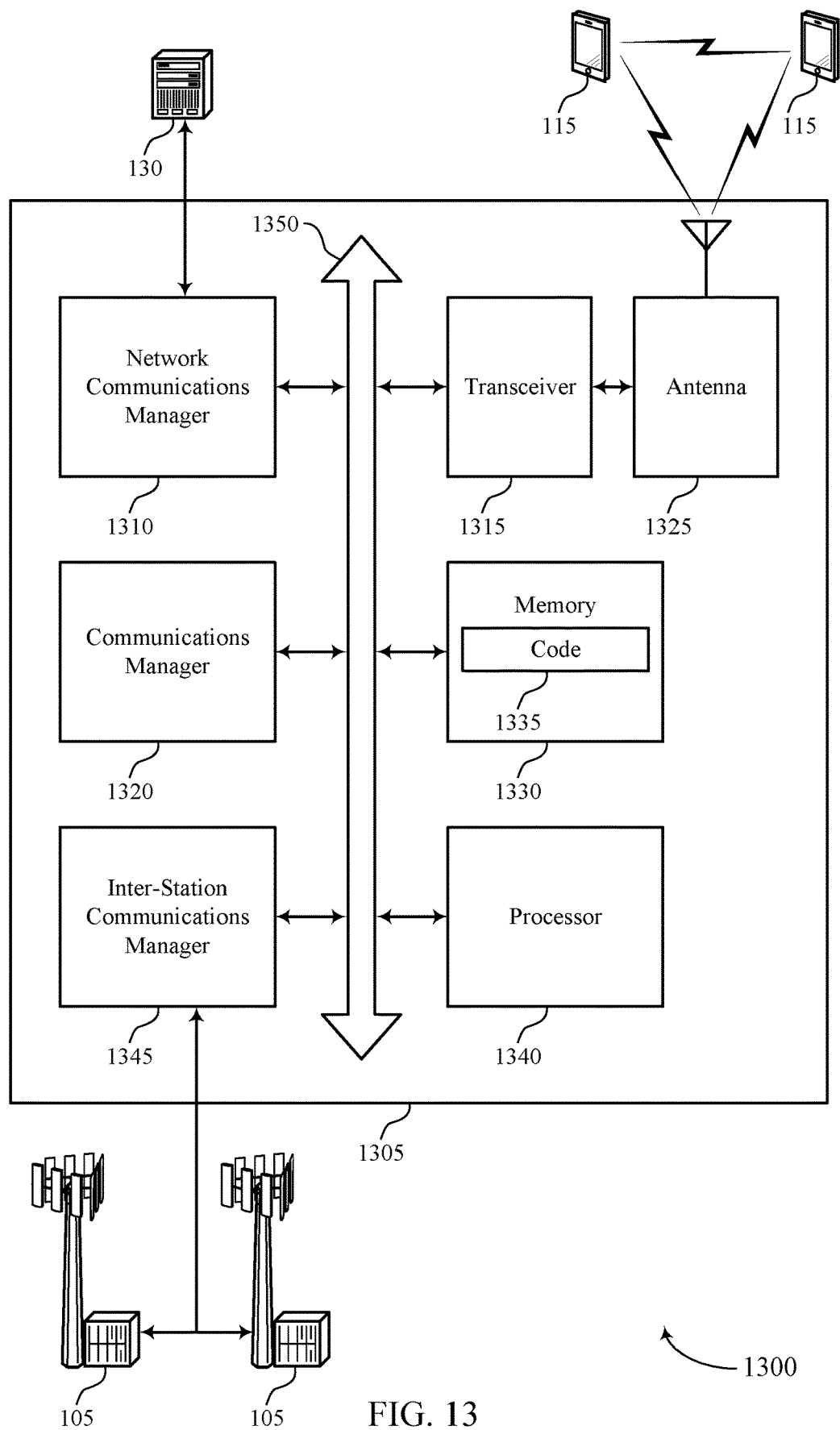
FIG. 13 shows a diagram of a system including a device that supports beam failure reason determining and reporting in accordance with aspects of the present disclosure.

FIG. 13 shows a diagram of a system 1300 including a device 1305 that supports beam failure reason determining and reporting in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam failure reason determining and reporting). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a set of multiple reference signals over a set of multiple beam measurement opportunities. The communications manager 1320 may be configured as or otherwise support a means for receiving, from the UE, first information that is indicative of beam failure occurring and second information that is indicative of one or more contributing factors to the beam failure.

By including or configuring the communications manager 1320 in accordance with examples as described herein, the device 1305 may support techniques for improved reliability, latency, data rates, spectral efficiency, resource usage, coordination between devices, and processing capability, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of beam failure reason determining and reporting as described herein, or the processor 1340 and the memory 1330 may be otherwise configured to perform or support such operations.

Figure 14:
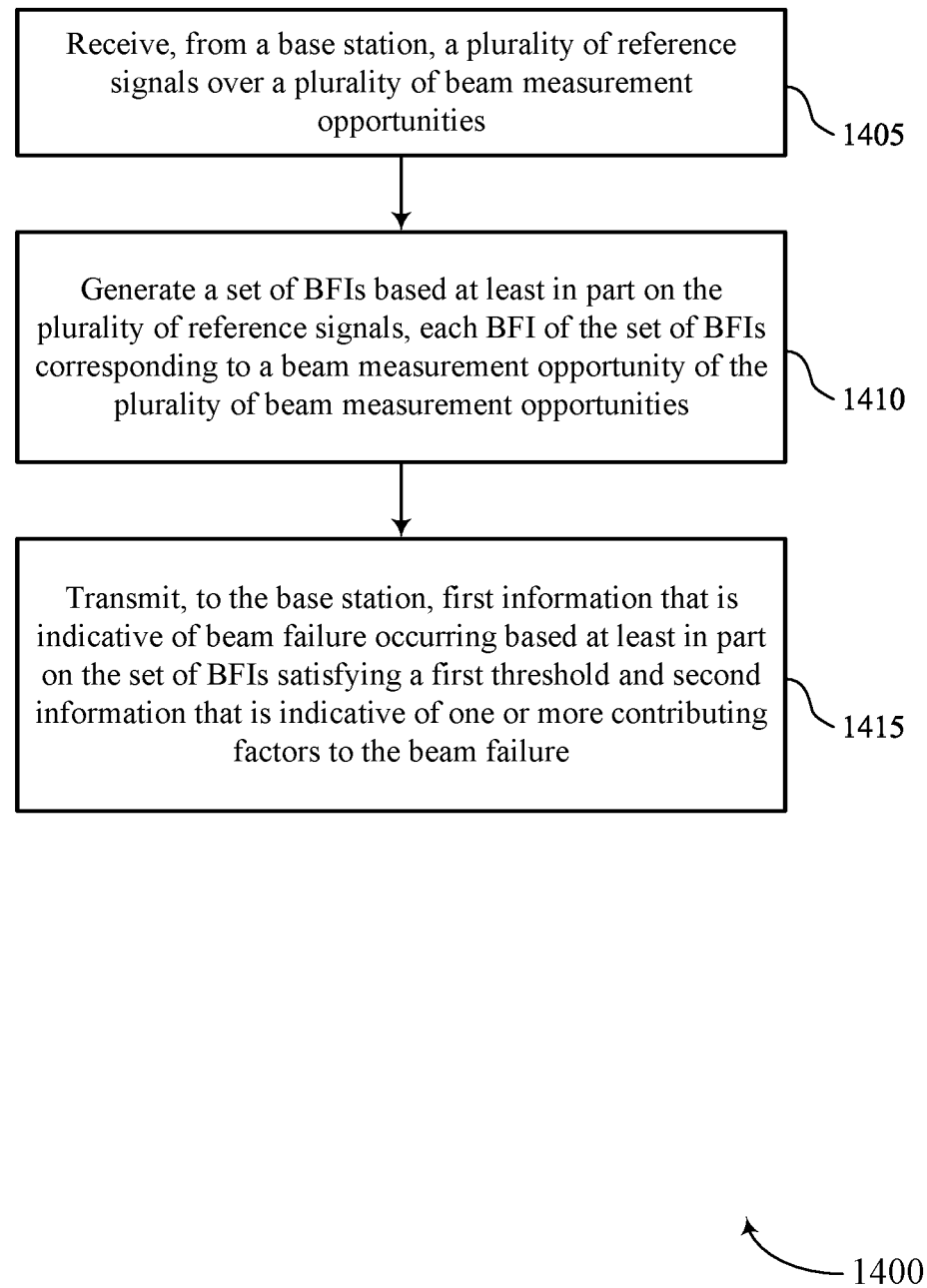
FIGS. 14 through 20 show flowcharts illustrating methods that support beam failure reason determining and reporting in accordance with aspects of the present disclosure.

FIG. 14 shows a flowchart illustrating a method 1400 that supports beam failure reason determining and reporting in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a set of multiple reference signals over a set of multiple beam measurement opportunities. The operations of 1405 may be performed in accordance with examples as disclosed herein. In some examples, aspects of the operations of 1405 may be performed by a reference signal component 825 as described with reference to FIG. 8.

At 1410, the method may include generating a set of BFIs based on the set of multiple reference signals, each BFI of the set of BFIs corresponding to a beam measurement opportunity of the set of multiple beam measurement opportunities. The operations of 1410 may be performed in accordance with examples as disclosed herein. In some examples, aspects of the operations of 1410 may be performed by a BFI component 830 as described with reference to FIG. 8.

At 1415, the method may include transmitting, to the base station, first information that is indicative of beam failure occurring based on the set of BFIs satisfying a first threshold and second information that is indicative of one or more contributing factors to the beam failure. The operations of 1415 may be performed in accordance with examples as disclosed herein. In some examples, aspects of the operations of 1415 may be performed by an information component 835 as described with reference to FIG. 8.

Figure 15:
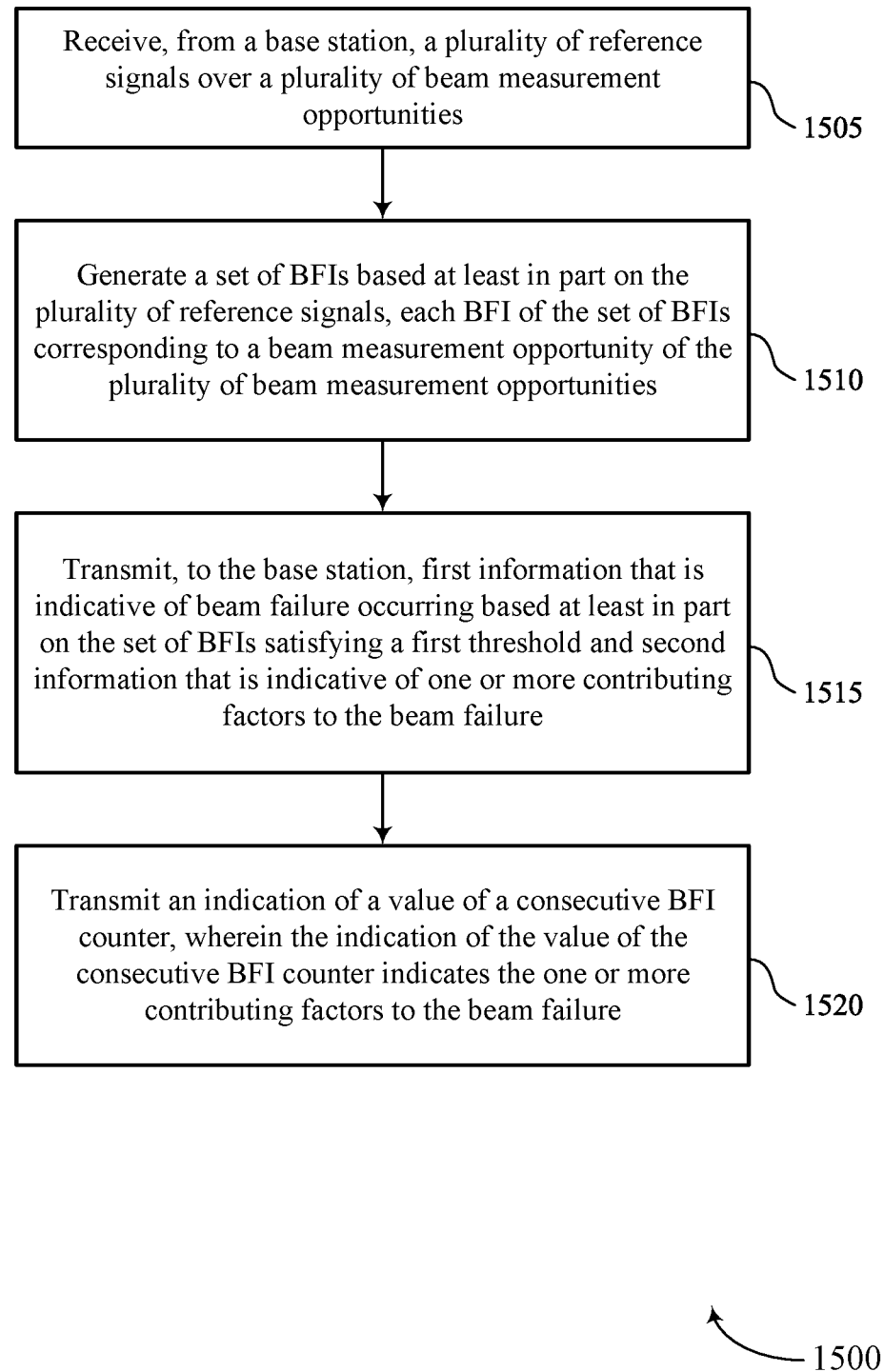

FIG. 15 shows a flowchart illustrating a method 1500 that supports beam failure reason determining and reporting in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a set of multiple reference signals over a set of multiple beam measurement opportunities. The operations of 1505 may be performed in accordance with examples as disclosed herein. In some examples, aspects of the operations of 1505 may be performed by a reference signal component 825 as described with reference to FIG. 8.

At 1510, the method may include generating a set of BFIs based on the set of multiple reference signals, each BFI of the set of BFIs corresponding to a beam measurement opportunity of the set of multiple beam measurement opportunities. The operations of 1510 may be performed in accordance with examples as disclosed herein. In some examples, aspects of the operations of 1510 may be performed by a BFI component 830 as described with reference to FIG. 8.

At 1515, the method may include transmitting, to the base station, first information that is indicative of beam failure occurring based on the set of BFIs satisfying a first threshold and second information that is indicative of one or more contributing factors to the beam failure. The operations of 1515 may be performed in accordance with examples as disclosed herein. In some examples, aspects of the operations of 1515 may be performed by an information component 835 as described with reference to FIG. 8.

At 1520, to transmit the second information, the method may include transmitting an indication of a value of a consecutive BFI counter, where the indication of the value of the consecutive BFI counter indicates the one or more contributing factors to the beam failure. The operations of 1520 may be performed in accordance with examples as disclosed herein. In some examples, aspects of the operations of 1520 may be performed by a counter component 840 as described with reference to FIG. 8.

Figure 16:
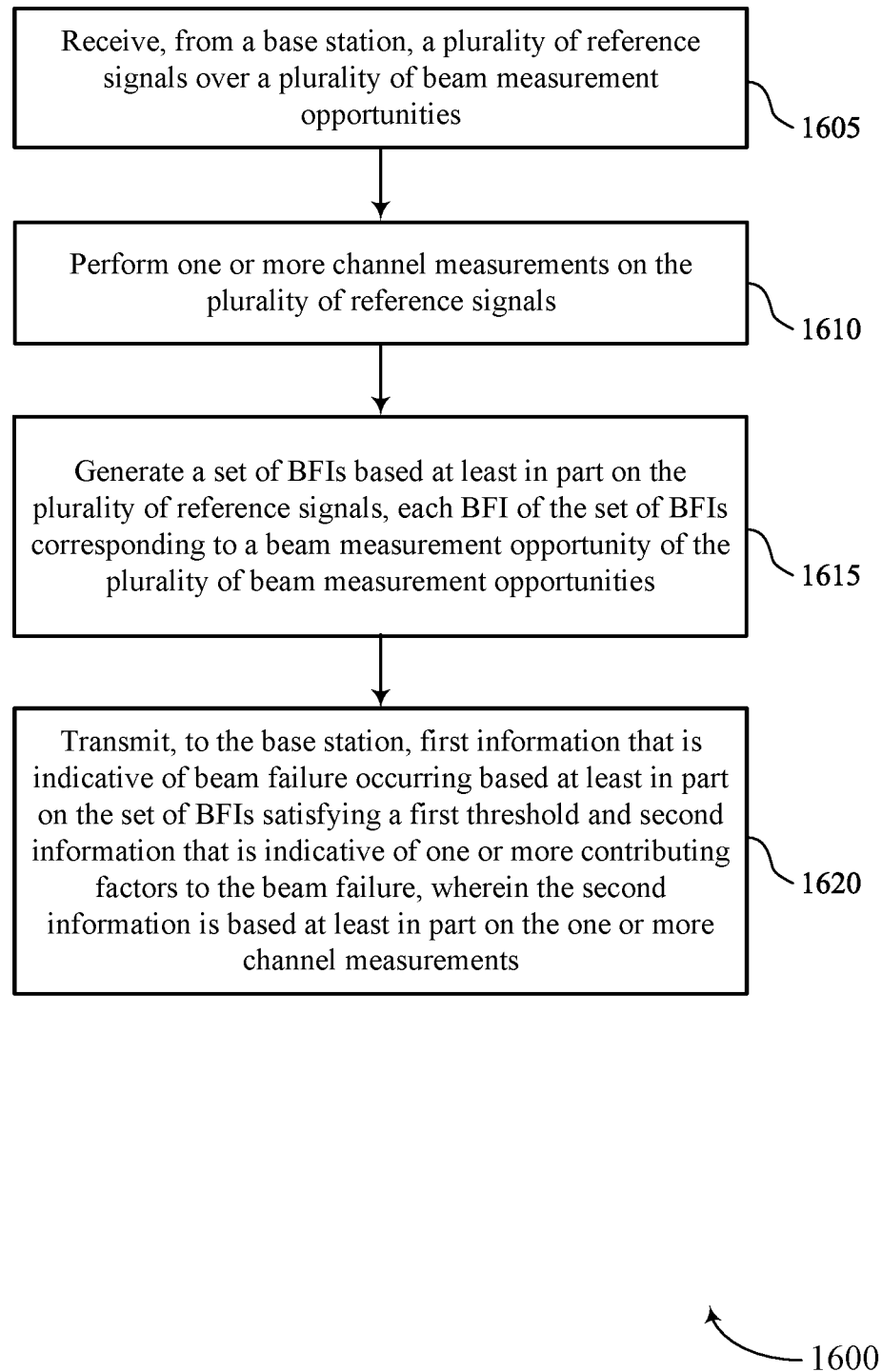

FIG. 16 shows a flowchart illustrating a method 1600 that supports beam failure reason determining and reporting in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a set of multiple reference signals over a set of multiple beam measurement opportunities. The operations of 1605 may be performed in accordance with examples as disclosed herein. In some examples, aspects of the operations of 1605 may be performed by a reference signal component 825 as described with reference to FIG. 8.

At 1610, the method may include performing one or more channel measurements on the set of multiple reference signals. The operations of 1610 may be performed in accordance with examples as disclosed herein. In some examples, aspects of the operations of 1610 may be performed by a measurement component 845 as described with reference to FIG. 8.

At 1615, the method may include generating a set of BFIs based on the set of multiple reference signals, each BFI of the set of BFIs corresponding to a beam measurement opportunity of the set of multiple beam measurement opportunities. The operations of 1615 may be performed in accordance with examples as disclosed herein. In some examples, aspects of the operations of 1615 may be performed by a BFI component 830 as described with reference to FIG. 8.

At 1620, the method may include transmitting, to the base station, first information that is indicative of beam failure occurring based on the set of BFIs satisfying a first threshold and second information that is indicative of one or more contributing factors to the beam failure, where the second information is based on the one or more channel measurements. The operations of 1620 may be performed in accordance with examples as disclosed herein. In some examples, aspects of the operations of 1620 may be performed by an information component 835 as described with reference to FIG. 8.

Figure 17:
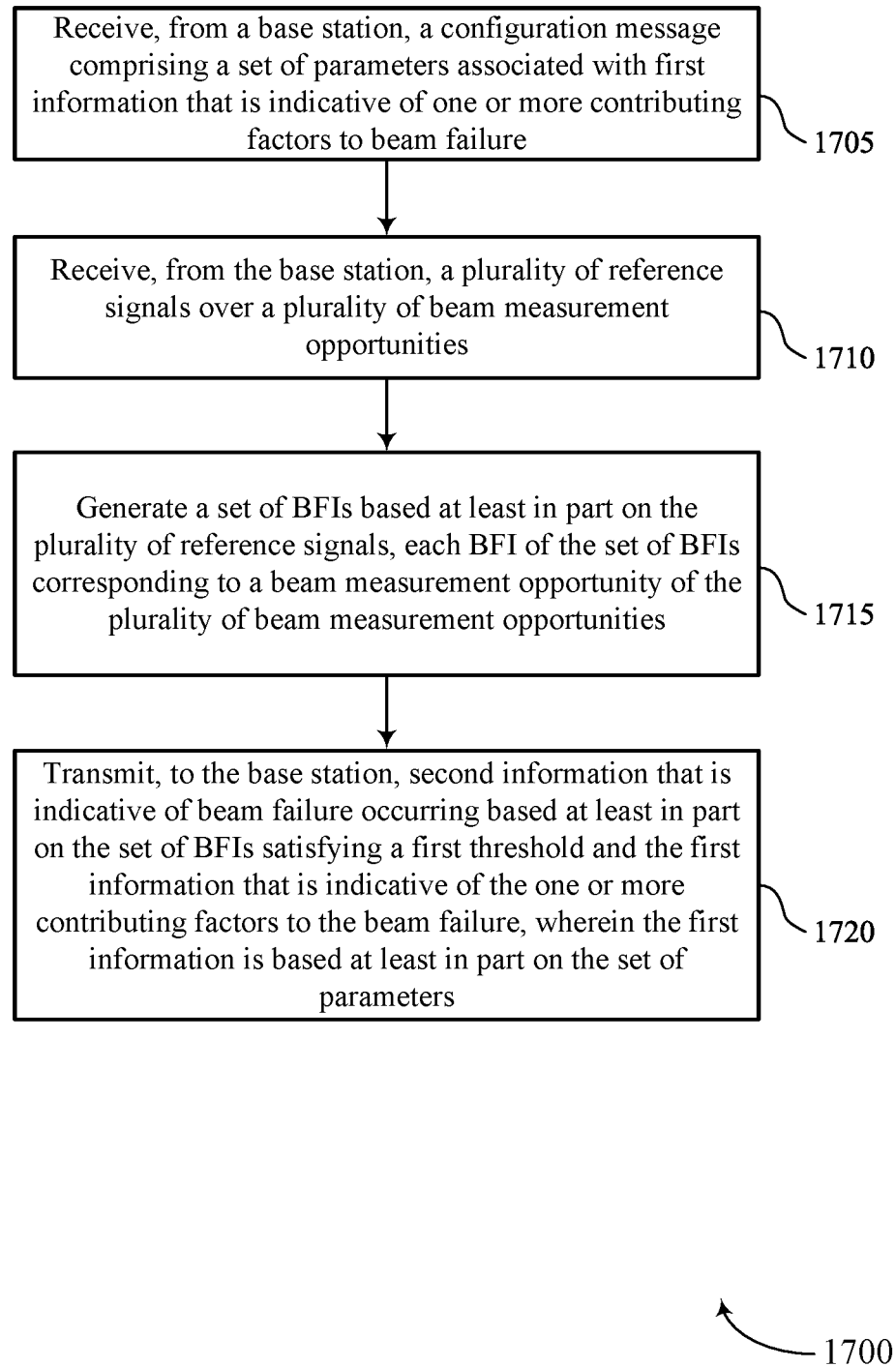

FIG. 17 shows a flowchart illustrating a method 1700 that supports beam failure reason determining and reporting in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a configuration message including a set of parameters associated with second information that is indicative of one or more contributing factors to beam failure. The operations of 1705 may be performed in accordance with examples as disclosed herein. In some examples, aspects of the operations of 1705 may be performed by a parameter component 850 as described with reference to FIG. 8.

At 1710, the method may include receiving, from the base station, a set of multiple reference signals over a set of multiple beam measurement opportunities. The operations of 1710 may be performed in accordance with examples as disclosed herein. In some examples, aspects of the operations of 1710 may be performed by a reference signal component 825 as described with reference to FIG. 8.

At 1715, the method may include generating a set of BFIs based on the set of multiple reference signals, each BFI of the set of BFIs corresponding to a beam measurement opportunity of the set of multiple beam measurement opportunities. The operations of 1715 may be performed in accordance with examples as disclosed herein. In some examples, aspects of the operations of 1715 may be performed by a BFI component 830 as described with reference to FIG. 8.

At 1720, the method may include transmitting, to the base station, second information that is indicative of beam failure occurring based on the set of BFIs satisfying a first threshold and the first information that is indicative of the one or more contributing factors to the beam failure, where the first information is based on the set of parameters. The operations of 1720 may be performed in accordance with examples as disclosed herein. In some examples, aspects of the operations of 1720 may be performed by an information component 835 as described with reference to FIG. 8.

Figure 18:
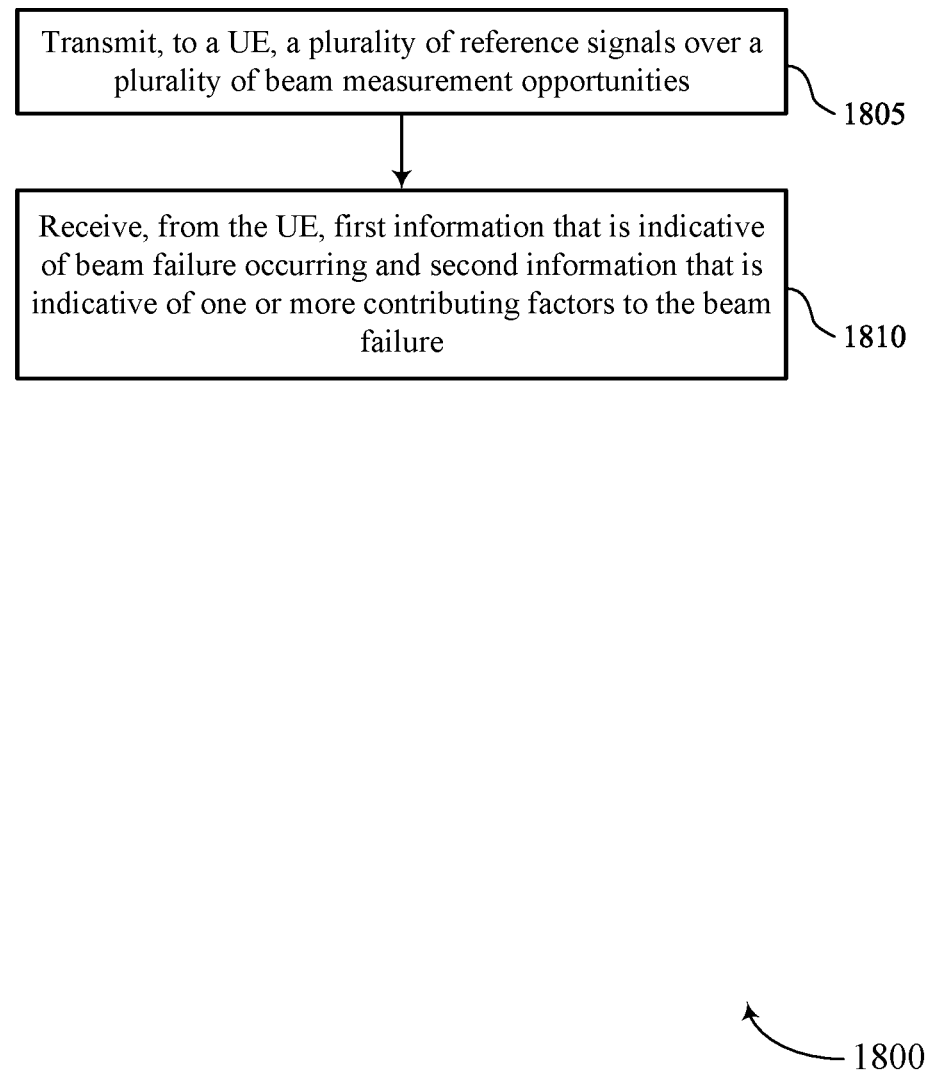

FIG. 18 shows a flowchart illustrating a method 1800 that supports beam failure reason determining and reporting in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a set of multiple reference signals over a set of multiple beam measurement opportunities. The operations of 1805 may be performed in accordance with examples as disclosed herein. In some examples, aspects of the operations of 1805 may be performed by a reference signal component 1225 as described with reference to FIG. 12.

At 1810, the method may include receiving, from the UE, first information that is indicative of beam failure occurring and second information that is indicative of one or more contributing factors to the beam failure. The operations of 1810 may be performed in accordance with examples as disclosed herein. In some examples, aspects of the operations of 1810 may be performed by an information component 1230 as described with reference to FIG. 12.

Figure 19:
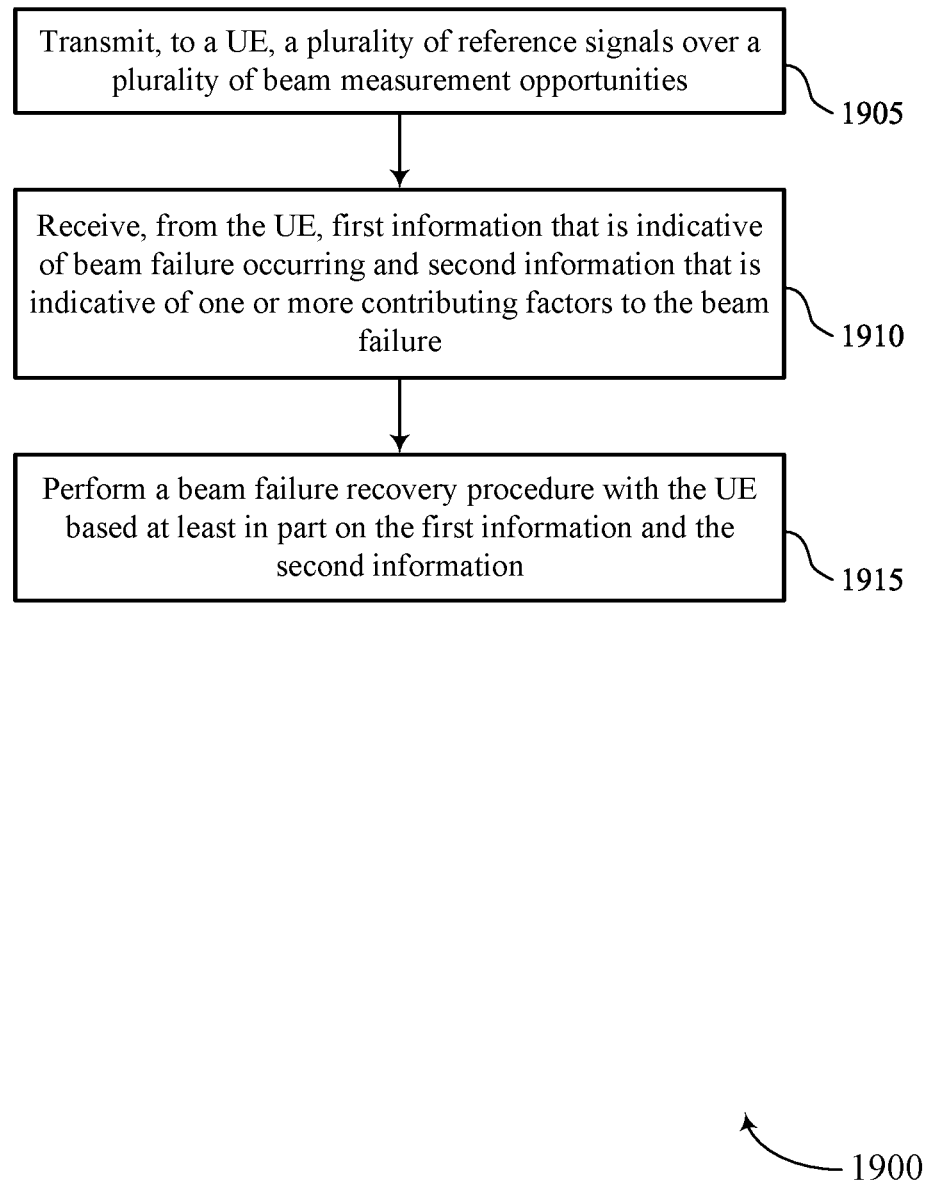

FIG. 19 shows a flowchart illustrating a method 1900 that supports beam failure reason determining and reporting in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a set of multiple reference signals over a set of multiple beam measurement opportunities. The operations of 1905 may be performed in accordance with examples as disclosed herein. In some examples, aspects of the operations of 1905 may be performed by a reference signal component 1225 as described with reference to FIG. 12.

At 1910, the method may include receiving, from the UE, first information that is indicative of beam failure occurring and second information that is indicative of one or more contributing factors to the beam failure. The operations of 1910 may be performed in accordance with examples as disclosed herein. In some examples, aspects of the operations of 1910 may be performed by an information component 1230 as described with reference to FIG. 12.

At 1915, the method may include performing a beam failure recovery procedure with the UE based on the first information and the second information. The operations of 1915 may be performed in accordance with examples as disclosed herein. In some examples, aspects of the operations of 1915 may be performed by a recovery component 1235 as described with reference to FIG. 12.

Figure 20:
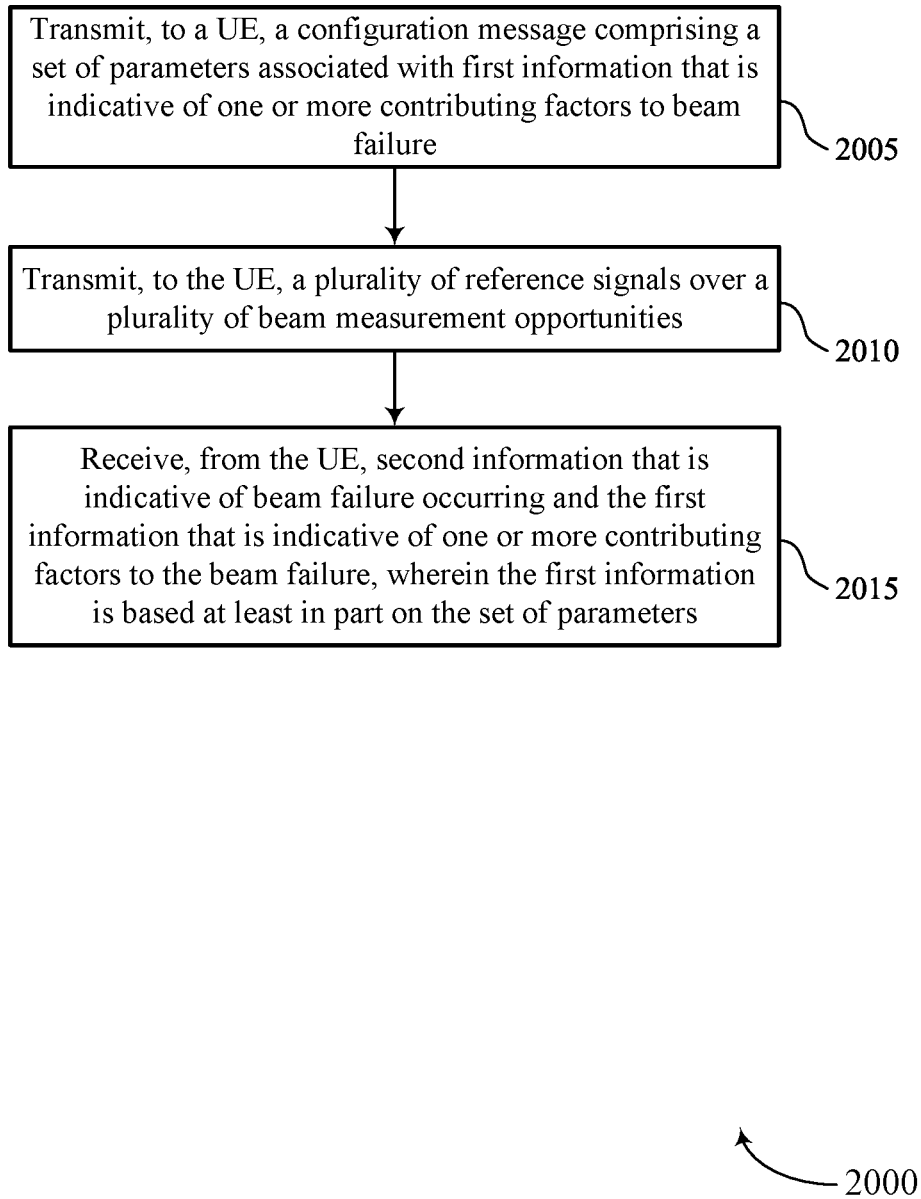

FIG. 20 shows a flowchart illustrating a method 2000 that supports beam failure reason determining and reporting in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a configuration message including a set of parameters associated with first information that is indicative of one or more contributing factors to beam failure. The operations of 2005 may be performed in accordance with examples as disclosed herein. In some examples, aspects of the operations of 2005 may be performed by a parameter component 1240 as described with reference to FIG. 12.

At 2010, the method may include transmitting, to the UE, a set of multiple reference signals over a set of multiple beam measurement opportunities. The operations of 2010 may be performed in accordance with examples as disclosed herein. In some examples, aspects of the operations of 2010 may be performed by a reference signal component 1225 as described with reference to FIG. 12.

At 2015, the method may include receiving, from the UE, second information that is indicative of beam failure occurring and the first information that is indicative of the one or more contributing factors to the beam failure, where the first information is based on the set of parameters. The operations of 2015 may be performed in accordance with examples as disclosed herein. In some examples, aspects of the operations of 2015 may be performed by an information component 1230 as described with reference to FIG. 12.

The following provides an overview of aspects of the present disclosure:

Aspect 1: A method for wireless communication at a UE, comprising: receiving, from a base station, a plurality of reference signals over a plurality of beam measurement opportunities; generating a set of BFIs based at least in part on the plurality of reference signals, each BFI of the set of BFIs corresponding to a beam measurement opportunity of the plurality of beam measurement opportunities; and transmitting, to the base station, first information that is indicative of beam failure occurring based at least in part on the set of BFIs satisfying a first threshold and second information that is indicative of one or more contributing factors to the beam failure.

Aspect 2: The method of aspect 1, wherein transmitting the second information further comprises: transmitting an indication of a value of a consecutive BFI counter, wherein the indication of the value of the consecutive BFI counter indicates the one or more contributing factors to the beam failure.

Aspect 3: The method of aspect 2, wherein the second information indicates that the one or more contributing factors comprise interference experienced at the UE based at least in part on a greatest value of the consecutive BFI counter satisfying a second threshold.

Aspect 4: The method of aspect 2, wherein the second information indicates that the one or more contributing factors comprise noise experienced at the UE based at least in part on a greatest value of the consecutive BFI counter failing to satisfy a second threshold.

Aspect 5: The method of any of aspects 2 through 4, wherein the second information comprises a first indication of whether a greatest value of the consecutive BFI counter satisfies a second threshold or a second indication of the greatest value of the consecutive BFI counter.

Aspect 6: The method of any of aspects 1 through 5, wherein the second information indicates a total quantity of BFIs of the set of BFIs that correspond to consecutive reference signals of the plurality of reference signals in a time domain.

Aspect 7: The method of any of aspects 1 through 6, further comprising: performing one or more channel measurements on the plurality of reference signals, wherein the second information is based at least in part on the one or more channel measurements.

Aspect 8: The method of aspect 7, further comprising: mapping the one or more channel measurements to the one or more contributing factors, wherein the second information comprises an indication of the one or more contributing factors based at least in part on the mapping.

Aspect 9: The method of any of aspects 7 through 8, wherein the second information indicates that the one or more contributing factors comprise interference experienced at the UE based at least in part on a quantity of measurement occasions satisfying a threshold quantity, a measurement occasion of the quantity of measurement occasions corresponding to an SINR for a reference signal of the plurality of reference signals being less than an SINR threshold and an SNR for the reference signal exceeding an SNR threshold based at least in part on the one or more channel measurements.

Aspect 10: The method of any of aspects 7 through 8, wherein the second information indicates that the one or more contributing factors comprise noise experienced at the UE based at least in part on a quantity of measurement occasions failing to satisfy a threshold quantity, a measurement occasion of the quantity of measurement occasions corresponding to an SINR for a reference signal of the plurality of reference signals being less than an SINR threshold and an SNR for the reference signal exceeding an SNR threshold based at least in part on the one or more channel measurements.

Aspect 11: The method of any of aspects 7 through 8, wherein the second information indicates that the one or more contributing factors comprise interference experienced at the UE based at least in part on a quantity of measurement occasions satisfying a threshold quantity, a measurement occasion of the quantity of measurement occasions corresponding to an SINR for a reference signal of the plurality of reference signals being less than an SINR threshold and an RSRP for the reference signal exceeding an RSRP threshold based at least in part on the one or more channel measurements.

Aspect 12: The method of any of aspects 7 through 8, wherein the second information indicates that the one or more contributing factors comprise noise experienced at the UE based at least in part on a quantity of measurement occasions failing to satisfy a threshold quantity, a measurement occasion of the quantity of measurement occasions corresponding to an SINR for a reference signal of the plurality of reference signals being less than an SINR threshold and an RSRP for the reference signal exceeding an RSRP threshold based at least in part on the one or more channel measurements.

Aspect 13: The method of aspect 7, wherein the second information comprises the one or more channel measurements.

Aspect 14: The method of any of aspects 7 through 13, wherein the one or more channel measurements comprise an SINR for each of the plurality of reference signals, an SNR for each of the plurality of reference signals, an RSRP for each of the plurality of reference signals, or a combination thereof.

Aspect 15: The method of any of aspects 1 through 14, further comprising: receiving, from the base station, a configuration message comprising a set of parameters associated with the second information.

Aspect 16: The method of aspect 15, wherein the set of parameters comprises a set of contributing factors capable of causing the beam failure that comprises the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

Aspect 17: The method of any of aspects 15 through 16, further comprising: transmitting, to the base station, a request to change one or more parameters of the set of parameters; and receiving, from the base station, a second configuration message comprising a second set of parameters associated with the second information, the second set of parameters corresponding to an updated set of parameters based at least in part on the request.

Aspect 18: The method of any of aspects 1 through 17, further comprising: initiating a RACH procedure associated with beam failure recovery based at least in part on the set of BFIs satisfying the first threshold, wherein the second information is transmitted after a completion of the RACH procedure.

Aspect 19: The method of any of aspects 1 through 18, wherein the second information is transmitted via a MAC-CE, UCI signaling, or a combination thereof.

Aspect 20: The method of any of aspects 1 through 17, wherein the second information is transmitted via a BFRQ on a primary cell based at least in part on the beam failure being associated with communications between the UE and the base station on a secondary cell.

Aspect 21: The method of any of aspects 1 through 20, wherein the one or more contributing factors comprise interference experienced at the UE or noise experienced at the UE.

Aspect 22: The method of any of aspects 1 through 21, further comprising: performing a beam failure recovery procedure with the base station based at least in part on the first information and the second information.

Aspect 23: A method for wireless communication at a base station, comprising: transmitting, to a UE, a plurality of reference signals over a plurality of beam measurement opportunities; and receiving, from the UE, first information that is indicative of beam failure occurring and second information that is indicative of one or more contributing factors to the beam failure.

Aspect 24: The method of aspect 23, further comprising: performing a beam failure recovery procedure with the UE based at least in part on the first information and the second information.

Aspect 25: The method of any of aspects 23 through 24, wherein the second information indicates the one or more contributing factors to the beam failure.

Aspect 26: The method of any of aspects 23 through 25, further comprising: transmitting, to the UE, a configuration message comprising a set of parameters associated with the second information.

Aspect 27: The method of aspect 26, wherein the set of parameters comprises a set of contributing factors capable of causing the beam failure that comprises the one or more contributing factors, a threshold quantity of consecutive BFIs, a lookup table for mapping channel measurements to the one or more contributing factors, a function for mapping the channel measurements to the one or more contributing factors, a reporting configuration for the second information, or a combination thereof.

Aspect 28: The method of any of aspects 26 through 27, further comprising: receiving, from the UE, a request to change one or more parameters of the set of parameters; and transmitting, to the UE, a second configuration message comprising a second set of parameters associated with the second information, the second set of parameters corresponding to an updated set of parameters based at least in part on the request.

Aspect 29: The method of any of aspects 23 through 28, further comprising: performing a RACH procedure associated with beam failure recovery based at least in part on the first information, wherein the second information is received after a completion of the RACH procedure.

Aspect 30: The method of any of aspects 23 through 29, wherein the one or more contributing factors comprise interference experienced at the UE or noise experienced at the UE.

Aspect 31: An apparatus for wireless communication at a UE, comprising a processor; memory coupled with the processor; and instructions stored in the memory and executable by the processor to cause the apparatus to perform a method of any of aspects 1 through 22.

Aspect 32: An apparatus for wireless communication at a UE, comprising at least one means for performing a method of any of aspects 1 through 22.

Aspect 33: A non-transitory computer-readable medium storing code for wireless communication at a UE, the code comprising instructions executable by a processor to perform a method of any of aspects 1 through 22.

Aspect 34: An apparatus for wireless communication at a base station, comprising a processor; memory coupled with the processor; and instructions stored in the memory and executable by the processor to cause the apparatus to perform a method of any of aspects 23 through 30.

Aspect 35: An apparatus for wireless communication at a base station, comprising at least one means for performing a method of any of aspects 23 through 30.

Aspect 36: A non-transitory computer-readable medium storing code for wireless communication at a base station, the code comprising instructions executable by a processor to perform a method of any of aspects 23 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, a plurality of reference signals over a plurality of beam measurement opportunities;
   generating a set of beam failure indicators based at least in part on the plurality of reference signals, each beam failure indicator of the set of beam failure indicators corresponding to a beam measurement opportunity of the plurality of beam measurement opportunities; and
   transmitting, to the network entity, first information that is indicative of beam failure occurring based at least in part on the set of beam failure indicators satisfying a first threshold and second information that is indicative of one or more contributing factors to the beam failure.

2. The method of claim 1, wherein transmitting the second information further comprises:
   transmitting an indication of a value of a consecutive beam failure indicator counter, wherein the indication of the value of the consecutive beam failure indicator counter indicates the one or more contributing factors to the beam failure.

3. The method of claim 2, wherein the second information indicates that the one or more contributing factors comprise interference experienced at the UE based at least in part on a greatest value of the consecutive beam failure indicator counter satisfying a second threshold.

4. The method of claim 2, wherein the second information indicates that the one or more contributing factors comprise noise experienced at the UE based at least in part on a greatest value of the consecutive beam failure indicator counter failing to satisfy a second threshold.

5. The method of claim 2, wherein the second information comprises a first indication of whether a greatest value of the consecutive beam failure indicator counter satisfies a second threshold or a second indication of the greatest value of the consecutive beam failure indicator counter.

6. The method of claim 1, wherein the second information indicates a total quantity of beam failure indicators of the set of beam failure indicators that correspond to consecutive reference signals of the plurality of reference signals in a time domain.

7. The method of claim 1, further comprising:
   performing one or more channel measurements on the plurality of reference signals, wherein the second information is based at least in part on the one or more channel measurements.

8. The method of claim 7, further comprising:
   mapping the one or more channel measurements to the one or more contributing factors, wherein the second information comprises an indication of the one or more contributing factors based at least in part on the mapping.

9. The method of claim 7, wherein the second information indicates that the one or more contributing factors comprise interference experienced at the UE based at least in part on a quantity of measurement occasions satisfying a threshold quantity, a measurement occasion of the quantity of measurement occasions corresponding to a signal-to-interference-plus-noise ratio for a reference signal of the plurality of reference signals being less than a signal-to-interference-plus-noise ratio threshold and a signal-to-noise ratio for the reference signal exceeding a signal-to-noise ratio threshold based at least in part on the one or more channel measurements.

10. The method of claim 7, wherein the second information indicates that the one or more contributing factors comprise noise experienced at the UE based at least in part on a quantity of measurement occasions failing to satisfy a threshold quantity, a measurement occasion of the quantity of measurement occasions corresponding to a signal-to-interference-plus-noise ratio for a reference signal of the plurality of reference signals being less than a signal-to-interference-plus-noise ratio threshold and a signal-to-noise ratio for the reference signal exceeding a signal-to-noise ratio threshold based at least in part on 8 the one or more channel measurements.

11. The method of claim 7, wherein the second information comprises the one or more channel measurements.

12. The method of claim 7, wherein the one or more channel measurements comprise a signal-to-interference-plus-noise ratio for each of the plurality of reference signals, a signal-to-noise ratio for each of the plurality of reference signals, a reference signal received power for each of the plurality of reference signals, or a combination thereof.

13. The method of claim 1, further comprising:
   receiving, from the network entity, a configuration message comprising a set of parameters associated with the second information.

14. The method of claim 13, wherein the set of parameters comprises a set of contributing factors capable of causing the beam failure that comprises the one or more contributing factors, a threshold quantity of consecutive beam failure indicators, a lookup table for mapping channel measurements to the one or more contributing factors, a function for mapping the channel measurements to the one or more contributing factors, a reporting configuration for the second information, or a combination thereof.

15. The method of claim 13, further comprising:
transmitting, to the network entity, a request to change one or more parameters of the set of parameters; and
receiving, from the network entity, a second configuration message comprising a second set of parameters associated with the second information, the second set of parameters corresponding to an updated set of parameters based at least in part on the request.

16. The method of claim 1, further comprising:
initiating a random access channel procedure associated with beam failure recovery based at least in part on the set of beam failure indicators satisfying the first threshold, wherein the second information is transmitted after a completion of the random access channel procedure.

17. The method of claim 1, wherein the second information is transmitted via a medium access control-control element, uplink control information signaling, or a combination thereof.

18. The method of claim 1, wherein the second information is transmitted via a beam failure recovery request on a primary cell based at least in part on the beam failure being associated with communications between the UE and the network entity on a secondary cell.

19. The method of claim 1, wherein the one or more contributing factors comprise interference experienced at the UE or noise experienced at the UE.

20. The method of claim 1, further comprising:
performing a beam failure recovery procedure with the network entity based at least in part on the first information and the second information.

21. A method for wireless communication at a network entity, comprising:
transmitting, to a user equipment (UE), a plurality of reference signals over a plurality of beam measurement opportunities; and
receiving, from the UE, first information that is indicative of beam failure occurring and second information that is indicative of one or more contributing factors to the beam failure.

22. The method of claim 21, further comprising:
performing a beam failure recovery procedure with the UE based at least in part on the first information and the second information.

23. The method of claim 21, wherein the second information indicates the one or more contributing factors to the beam failure.

24. The method of claim 21, further comprising:
transmitting, to the UE, a configuration message comprising a set of 3 parameters associated with the second information.

25. The method of claim 24, wherein the set of parameters comprises a set of contributing factors capable of causing the beam failure that comprises the one or more contributing factors, a threshold quantity of consecutive beam failure indicators, a lookup table for mapping channel measurements to the one or more contributing factors, a function for mapping the channel measurements to the one or more contributing factors, a reporting configuration for the second information, or a combination thereof.

26. The method of claim 24, further comprising:
receiving, from the UE, a request to change one or more parameters of the set of parameters; and
transmitting, to the UE, a second configuration message comprising a second set of parameters associated with the second information, the second set of parameters corresponding to an updated set of parameters based at least in part on the request.

27. The method of claim 21, further comprising:
performing a random access channel procedure associated with beam failure recovery based at least in part on the first information, wherein the second information is received after a completion of the random access channel procedure.

28. The method of claim 21, wherein the one or more contributing factors comprise interference experienced at the UE or noise experienced at the UE.

29. An apparatus a user equipment (UE) for wireless communication, comprising:
one or more memories storing processor-executable code; and
one or more processors coupled with the one or more memories and individually or collectively operable to execute the code to cause the UE to:
receive, from a network entity, a plurality of reference signals over a plurality of beam measurement opportunities;
generate a set of beam failure indicators based at least in part on the plurality of reference signals, each beam failure indicator of the set of beam failure indicators corresponding to a beam measurement opportunity of the plurality of beam measurement opportunities; and
transmit, to the network entity, first information that is indicative of beam failure occurring based at least in part on the set of beam failure indicators satisfying a first threshold and second information that is indicative of one or more contributing factors to the beam failure.

30. A network entity for wireless communication, comprising:
one or more memories storing processor-executable code; and
one or more processors coupled with the one or more memories and individually or collectively operable to execute the code to cause the network entity to:
transmit, to a user equipment (UE), a plurality of reference signals over a plurality of beam measurement opportunities; and
receive, from the UE, first information that is indicative of beam failure occurring and second information that is indicative of one or more contributing factors to the beam failure.

* * * * *